United States Patent
Shimano et al.

(10) Patent No.: US 7,031,496 B2
(45) Date of Patent: Apr. 18, 2006

(54) METHOD AND APPARATUS FOR OBJECT RECOGNITION USING A PLURALITY OF CAMERAS AND DATABASES

(75) Inventors: Mihoko Shimano, Tokyo (JP); Kenji Nagao, Yokohama (JP); Toshiaki Akimoto, Yokohama (JP); Tomonobu Naruoka, Kawasaki (JP)

(73) Assignee: Matsushita Electric Industrial.Co., Ltd., Osaka (JP)

( * ) Notice: Subject to any disclaimer, the term of this patent is extended or adjusted under 35 U.S.C. 154(b) by 591 days.

(21) Appl. No.: 09/884,099

(22) Filed: Jun. 20, 2001

(65) Prior Publication Data

US 2002/0001398 A1    Jan. 3, 2002

(30) Foreign Application Priority Data

Jun. 28, 2000 (JP) ............................ 2000-194199
May 9, 2001 (JP) ............................ 2001-139052

(51) Int. Cl.
*G06K 9/00* (2006.01)

(52) U.S. Cl. ................ 382/104; 382/190; 382/209; 382/294; 382/305

(58) Field of Classification Search ............... 382/104, 382/103, 190, 106, 154, 155, 159, 209, 294, 382/305

See application file for complete search history.

(56) References Cited

U.S. PATENT DOCUMENTS

| | | | | |
|---|---|---|---|---|
| 4,700,400 A | * | 10/1987 | Ross ........................ | 382/205 |
| 4,975,969 A | | 12/1990 | Tal .......................... | 382/2 |
| 5,161,107 A | | 11/1992 | Mayeaux et al. ........... | 364/436 |
| 5,465,308 A | * | 11/1995 | Hutcheson et al. ......... | 382/159 |
| 5,982,923 A | * | 11/1999 | Kim et al. ................... | 382/154 |
| 6,266,442 B1 | * | 7/2001 | Laumeyer et al. .......... | 382/190 |
| 6,335,754 B1 | * | 1/2002 | Endo et al. ................. | 348/37 |
| 6,480,841 B1 | * | 11/2002 | Higashio et al. ............ | 707/4 |
| 6,501,857 B1 | * | 12/2002 | Gotsman et al. ........... | 382/224 |
| 6,587,601 B1 | * | 7/2003 | Hsu et al. .................. | 382/294 |
| 6,647,139 B1 | * | 11/2003 | Kunii et al. ................ | 382/159 |

FOREIGN PATENT DOCUMENTS

| EP | 977014 A2 | * | 2/2000 |
|---|---|---|---|
| JP | 11-78692 | | 3/1999 |

OTHER PUBLICATIONS

Watanabe et al., entitled "Road Shape Reconstruction by Local Flatness Approximation", published on Sep. 21, 1989.
Kigasawa et al., entitled "Development of Object Detection Method using Stereo Images", 2nd Symposium on Sensing via Image Information (SII'96), published on Jun. 13, 1996.

(Continued)

*Primary Examiner*—Andrew W. Johns
*Assistant Examiner*—Patrick Edwards
(74) *Attorney, Agent, or Firm*—Greenblum & Bernstein, P.L.C.

(57) ABSTRACT

Based on image data taken and acquired by any one of a plurality of cameras, a predetermined object included in the image is recognized by pattern matching. A plurality of databases associated with a plurality of cameras is provided and a database to be used is changed according to the camera to be used. The plurality of databases can also be changed according to conditions such as weather and environment.

9 Claims, 25 Drawing Sheets

OTHER PUBLICATIONS

Miyaoka et al., entitled "Rear-side Observation of Vehicle Using Sequence of Road Images", 4th Symposium on Sensing via Image Information (SII'98), published on Jun. 11, 1998.

English Language abstract of Watanabe et al., entitled "Road Shape Reconstruction by Local Flatness Approximation", published on Sep. 21, 1989.

English Language abstract of Kigasawa et al., entitled "Development of Object Detection Method using Stereo Images", 2nd Symposium on Image Information (SII'96), published on Jun. 13, 1996.

English Language abstract of Miyaoka et al., entitled "Rear-side Observation of Vehicle Using Sequence of Road Images", 4th Symposium on Sensing via Image Information (SII'98), published on Jun. 11, 1998.

Mimuro et al. "Functions and Devices of Mitsubishi Active Safety ASV". Proceedings of the 1996 IEEE Intelligent Vehicles Symposium (Cat. No. 96TH8230). IEEE. New York, NY, 1996. pp. 248-253.

English Language Abstract of JP 11-78692.

Bertozzi et al. "Addressing Real-Time Requirements of Automatic Vehicle Guidance with MMX Technology". Parallel and Distributed Processing. 11th IPPS/SPDP '99 Workshops Held in Conjunction with the 13th International Parallel Processing Symposium and 10th Symposium on Parallel and Distributed Processing. Proceedings Springer-Verlag. Berlin, Germany, 1999. pp. 1407-1417.

* cited by examiner

METHOD AND APPARATUS FOR OBJECT RECOGNITION USING A PLURALITY OF CAMERAS AND DATABASES

BACKGROUND OF THE INVENTION

1. Field of the Invention

The present invention relates to an object recognition method and object recognition apparatus.

2. Description of the Related Art

The development of an advanced road traffic system (ITS: Intelligent Transport System) is underway in recent years. Vehicles used in the ITS are "Advanced Safety Vehicles (ASV)" provided with advanced intelligence resulting from full use of electronics technologies and significantly enhanced safety.

An Advanced Safety Vehicle (ASV) is provided with functions of supporting safe driving, preventing accidents or diminishing accidents and damages by detecting the traffic surroundings of the vehicle and road surface conditions, etc. using cameras and sensors.

Implementing various functions of such an Advanced Safety Vehicle (ASV) requires information acquired by cameras and sensors mounted on the own vehicle to be processed in real time to speedily obtain information such as the existence of other vehicles coming closer and distance to those vehicles.

Moreover, calculating the distance to nearby vehicles or obstacles requires three-dimensional image processing.

Three-dimensional image processing generally involves an enormous amount of calculations and processing delays become a problem. In addition, the Advanced Safety Vehicle (ASV) needs to monitor the surroundings of the own vehicle, and therefore needs to be equipped with a plurality of cameras (also a plurality of sensors).

As the number of cameras increases, the amount of information subject to image processing also grows drastically. On top of this, the volume of memory required for an image processing apparatus also increases, entailing increased amounts of hardware and cost.

Moreover, it is a procedure involving considerable difficulty to take pictures of objects against a complicated background, apply image processing thereto, recognize the objects and calculate the distance to those objects in real time. For example, simply reducing the resolution of images to save the amount of processing calculation and memory, etc. will make recognition of the objects itself difficult and the reliability of the distances calculated using the results of recognition of those objects becomes a problem.

The present invention has been implemented taking into account the points described above and it is an object of the present invention to provide a practicable object recognition method and object recognition apparatus capable of making the efficiency (processing speed) of image processing compatible with the accuracy of recognition of objects and the accuracy of measurement of distances to the objects, etc.

SUMMARY OF THE INVENTION

The present invention adopts a configuration that provides one image processing apparatus for a plurality of cameras and thereby reduces the volume of hardware. That is, image information acquired by a plurality of cameras is input to a common image processing apparatus.

Then, the image processing apparatus compares the image data input with data related to a model registered in a database (pattern matching) and decides the similarity and can thereby detect the positions of objects, types of the objects or rough distances to the objects at extremely high speed.

The database registers data related to various models. At this time, a plurality of databases is provided to improve the efficiency of pattern matching and a database to be used is changed according to the situation as appropriate.

In this case, it is desirable that each database be associated with each camera and each database be selected according to the camera to be used. Furthermore, associating each database not only with each camera but also with a predetermined condition (e.g., a condition that picture taking should be carried out during daytime in fine weather) will further improve the efficiency of database search and the accuracy of pattern matching.

It is also possible to provide a plurality of databases for every condition such as weather.

Additionally, a high-speed pattern matching method includes a technique consisting of multiplying input image data by a pre-acquired feature extracting vector to acquire a feature vector that enhances features of a predetermined model and comparing the feature vector with the feature vector of the model registered in a database.

Furthermore, prior to pattern matching processing, it is desirable that the image processing apparatus apply processing of focusing the search range of an object to some area of the input image to reduce the amount of data subject to image processing. This not only reduces burden on the hardware but also allows for faster processing.

When the distance from the position of a camera to an recognized object is measured, the distance to the object is detected in a three-dimensional space by carrying out image processing based on image information from one camera that has taken pictures of the object, reconstructing not only the position of the object but also a three-dimensional structure of a structure in which the object exists (if the object is a vehicle, the road is the structure) and identifying the position of the object in association with the reconstructed three-dimensional structure. This allows the distance to the object in the three-dimensional space to be measured using a single camera without using stereo picture taking.

Moreover, providing the user (e.g., the driver of the vehicle) with image information taken by a plurality of cameras, information on the type of the object recognized by pattern matching (e.g., the model of the vehicle) and information on the distance to the object in real time will make it possible to alleviate burden on the user and prevent danger. Modes of providing the user with information include a mode of appealing to visual perception, a mode of appealing to senses other than visual perception or a mode combining these modes.

The present invention allows common use of an image processing apparatus for processing images input by a plurality of cameras and reduces the number of image processing sections handled by the apparatus and thereby alleviates processing burden on the apparatus. Moreover, focusing the search range of objects makes it possible to reduce the amount of image data processed itself and thereby improve the efficiency of processing.

Furthermore, providing a database for every camera eliminates the necessity to search unnecessary databases, speeding up the pattern matching processing. Furthermore, when a search for unnecessary databases is carried out, the probability (probability of misjudging) that other models having similar parts will be judged as if a match had been detected. Therefore, when a database to be searched is specified as in the case of the present invention, the probability of misjudging is also reduced all the more and the accuracy of pattern matching improves.

If the information of models registered in the database includes information on the distance to an object, it is also possible to estimate a rough distance to the object by pattern matching. Furthermore, in the case of carrying out more accurate distance measurement, it is possible to calculate an exact distance to the object using a distance measuring section capable of measuring the distance to the object in the three-dimensional space only with images taken by one camera.

Furthermore, since an exact distance can be measured based on the images taken by one camera, there is no need for stereo picture taking and the cameras can be directed in different directions. This allows images surrounding the vehicle on which the cameras are mounted to be acquired over a wider range.

Thus, the present invention can provide a practical object recognition method and object recognition apparatus that satisfies both the real time characteristic and reliability.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 23 illustrates an example of an image obtained by extracting horizontal edges after applying differential processing to the image shown in FIG. 21;

DETAILED DESCRIPTION OF THE PREFERRED EMBODIMENTS

With reference now to the attached drawings, embodiments of the present invention will be explained in detail below.

Embodiment 1

Figure 1:
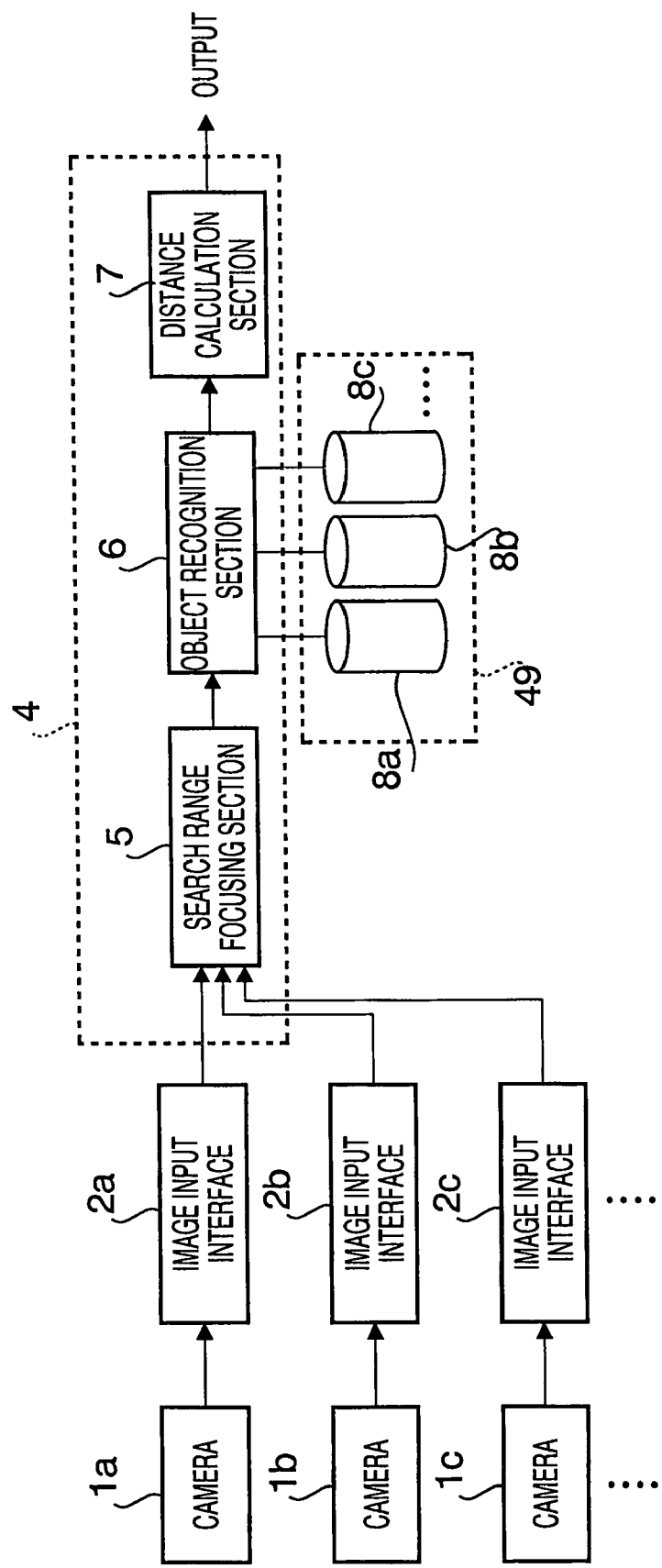
FIG. 1 is a block diagram showing an overall configuration of an object recognition apparatus (including a distance calculation section) of the present invention.

FIG. 1 is a block diagram showing a configuration of an object recognition apparatus according to Embodiment 1 of the present invention.

Main features of the object recognition apparatus of this embodiment comprise inputting image signals from a plurality of cameras that have taken pictures of different objects to a common (one) image processing section and thus reducing the volume of hardware, focusing the object search range by the first stage of the image processing section to reduce the volume of images to be processed and improve the processing speed, carrying out object recognition through matching with data about models (more specifically, feature vectors of models) registered beforehand in a learning database (more specifically, feature vector database) to speed up the object recognition processing, and providing a learning database for every camera and switching between learning databases in association with the camera used and thereby preventing unnecessary matching and improving the efficiency of matching processing and accuracy of object recognition.

As illustrated in the figure, this object recognition apparatus comprises a plurality of cameras 1a, 1b and 1c, image input interfaces 2a, 2b and 2c, image processing section 4 (including search range focusing section 5, object recognition section 6 and distance calculation section 7) and learning database 49 provided with feature vector databases 8a, 8b and 8c corresponding to cameras 8a, 8b and 8c.

The plurality of cameras 1a to 1c orient in different directions and take pictures of different objects. That is, unlike a camera for stereo picture taking that takes pictures of a same object using a plurality of cameras, each of the cameras in this embodiment can take pictures of different objects independently of one another.

Picture taking by one camera suffices because image processing apparatus 4 of this embodiment in the processing of measuring the distance to an object (which is carried out on the premise of the object recognition processing) applies image processing to the two-dimensional image data obtained from pictures taken by one camera and can thereby calculate the distance to an object in the three-dimensional space (this will be described later).

Image input interfaces 2a to 2c are each fed image signals taken by cameras 1a to 1c and carry out signal processing such as noise elimination.

Search range focusing section 5 focuses the search range looking for areas where objects are likely to exist in an image based on the entered image data.

Object recognition section (object estimating means) 6 recognizes the position and type of an object in the image and further roughly estimates the distance to the object if possible. Object recognition is carried out by judging the similarity between feature vectors.

Learning database 49 stores feature vectors of models acquired by advance learning. In the learning stage, pictures of various objects are taken using a plurality of cameras 1a to 1c, an array of density values of pixel data of the image acquired is regarded as a one-dimensional vector, the content of the one-dimensional vector is analyzed and thereby a feature vector indicating the features of the one-dimensional vector is extracted and a database (feature vector database) is created by storing the feature vectors about various models.

What should be noted here is that a plurality of feature vector databases (8a to 8c) is provided in a one-to-one correspondence with cameras 1a to 1c.

Distance calculation section 7 calculates the distance to the object in a real space (three-dimensional space) based on the positional information (positional information in a two-dimensional image) of the object in the image obtained by object recognition section 6 and outputs the measurement result.

The operations (functions) of the sections of the object recognition apparatus configured as shown above will be explained below.

What should be noted in particular is the object recognition processing that changes feature vector databases 8a to 8c according to the camera (1a to 1c) that has taken pictures of the image data subject to image processing.

Images input from the plurality of cameras 1a to 1c are given to image processing section 4 via image input interfaces 2a to 2c.

Cameras 1a to 1c correspond, for example, to the front right camera, front left camera and rear left camera.

Then, the specific operations of the sections of image processing section 4 will be explained.

Sections 5 to 7 included in image processing section 4 carry out the following processing on images entered from the plurality of cameras 1a to 1c.

Focusing of a search range carried out by search range focusing section 5 is the processing of determining a range in which an object is expected to be found with an extremely high probability from the entire image range for the purpose of reducing burden on the apparatus and speeding up signal processing.

For example, in the case where the position of an object in an image is known beforehand, the range in which the object exists is assumed to be the search range. For example, in the case of a vehicle running on a road, the search range can be limited to a space on the road.

However, the search range focusing method is not limited to this method but other focusing methods can also be used.

For example, an optical flow method can be used. Area detection using the optical flow method is disclosed, for example, in the document "Rear Side Monitoring by Moving Image Processing" (by Miyaoka et al., collected papers of lectures of the 4th symposium on Sensing via Image Information, pp. 351–354).

That is, suppose a case where both the camera and object are moving. When seen from the camera, the object and background are relatively moving. However, since the background differs from the object in the mode and speed of movement, it is possible to focus the area in which the object is possibly moving centered on this difference in movement. The accuracy of focusing increases in this case.

In this way, search range focusing section 5 focuses the search range by expressing the detected area with a rectangle and outputting the coordinates of the vertices as the area information.

Then, the operations of object recognition section 6 for recognizing the position and type of the object in the image (further, estimating the distance to the object if possible) will be explained.

Object recognition section 6 estimates the exact position, etc. of the object in the search range focused by search range focusing section 5 and sends the result as the positional information to distance calculation section 7.

There are several techniques for identifying the position, etc. of the object in the image. For example, a method of judging the similarity to data about an already registered model provides detection with high accuracy, allows speedy processing, and is therefore preferable.

This method uses a pattern recognition technology and there are various kinds of object recognition techniques using pattern matching.

For example, the object recognition techniques using pattern matching include methods such as a method of extracting features of image data of individual models themselves and making a comparison between these features, a method of roughly dividing models into classes instead of using individual models, extracting features class by class and making a comparison between these features or a method of making a comparison between image data items themselves without extracting features.

The method of making a comparison between features class by class will be explained using FIG. 2 and FIG. 3 below.

Figure 2:
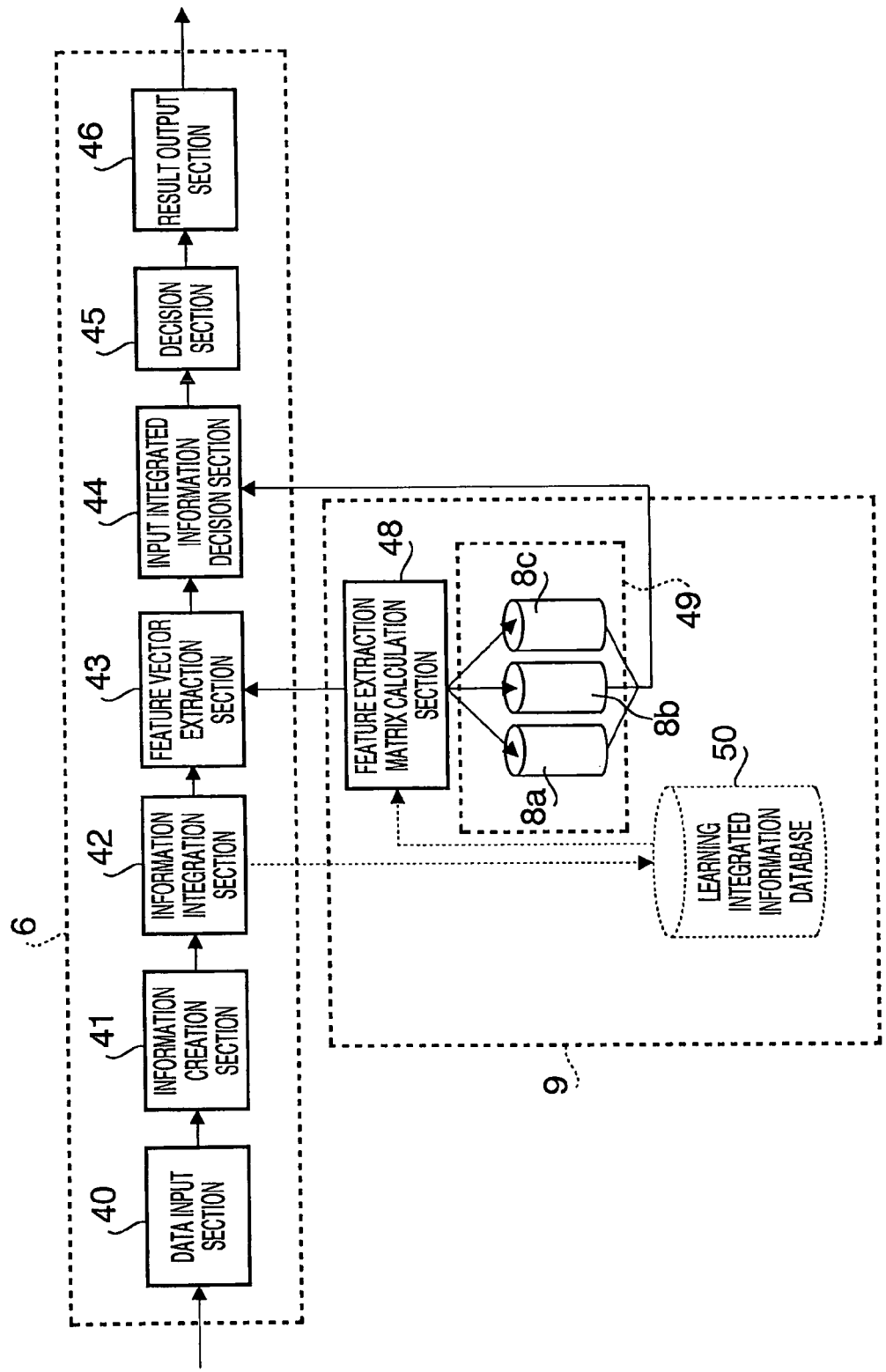
FIG. 2 is a block diagram showing a specific configuration of the object recognition section and database section shown in FIG. 1.

FIG. 2 is a block diagram showing a specific configuration of object recognition section 6 in FIG. 1. In the figure, reference numeral 9 denotes a section used to construct learning database 49 through advance learning (learning tool). In learning tool 9, elements used in a learning process are shown with dotted line and elements used for actual object recognition processing are shown with solid line.

Learning integrated information database 50 included in learning tool 9 divides vehicle models into classes (e.g., sedan, truck, bus) and stores image data of each class as learning integrated information.

Furthermore, feature extraction matrix calculation section 48 calculates variance, etc. about image data of each class, calculates and retains a feature extraction matrix to extract a vector expressing features of the image data that belongs to the class.

The feature extraction matrix has the following functions. That is, when image data belonging to a specific class and image data belonging to other classes are multiplied by a feature extraction matrix to extract features of a specific class, numerical data (feature vector) having similar features is obtained for all image data belonging to the specific class and completely different numerical data (feature vector) is obtained for image data of other classes.

That is, multiplying the image data by a feature extraction matrix of a predetermined class results in organized numerical data with common features stressed for the image data belonging to a same class, but results in completely different numerical data for the image data belonging to a different class.

Feature extraction matrix calculation section 48 obtains and retains such a feature extraction matrix through calculations.

The feature extraction matrix obtained is, for example, multiplied on a typical value (e.g., average value) of the image data of a class and a feature vector (vector showing the result of multiplication of the feature extraction matrix) for each class is acquired.

A feature vector is calculated for each camera. The feature vector corresponding to camera 1a is stored in database 8a. The feature vector corresponding to camera 1b is stored in database 8b. In the same way, the feature vector corresponding to camera 1c is stored in database 8c.

The arrows with dotted line in FIG. 2 show the procedure in the learning stage.

In such a state, image data within the search range is supplied from data input section 40 in FIG. 2.

Information creation section 41 creates a one-dimensional vector by arraigning brightness values (density information) of pixels making up the image in the sequence of pixels. Information integration section 42 simply connects the information created.

Feature vector extraction section 43 extracts a feature vector by multiplying the integrated one-dimensional vector (integrated vector) by the feature extraction matrix calculated by feature extraction matrix calculation section 48 as described above.

Input integrated information decision section 44 compares the extracted feature vector with the feature vector output from learning database 49 and calculates the similarity.

Figure 7:
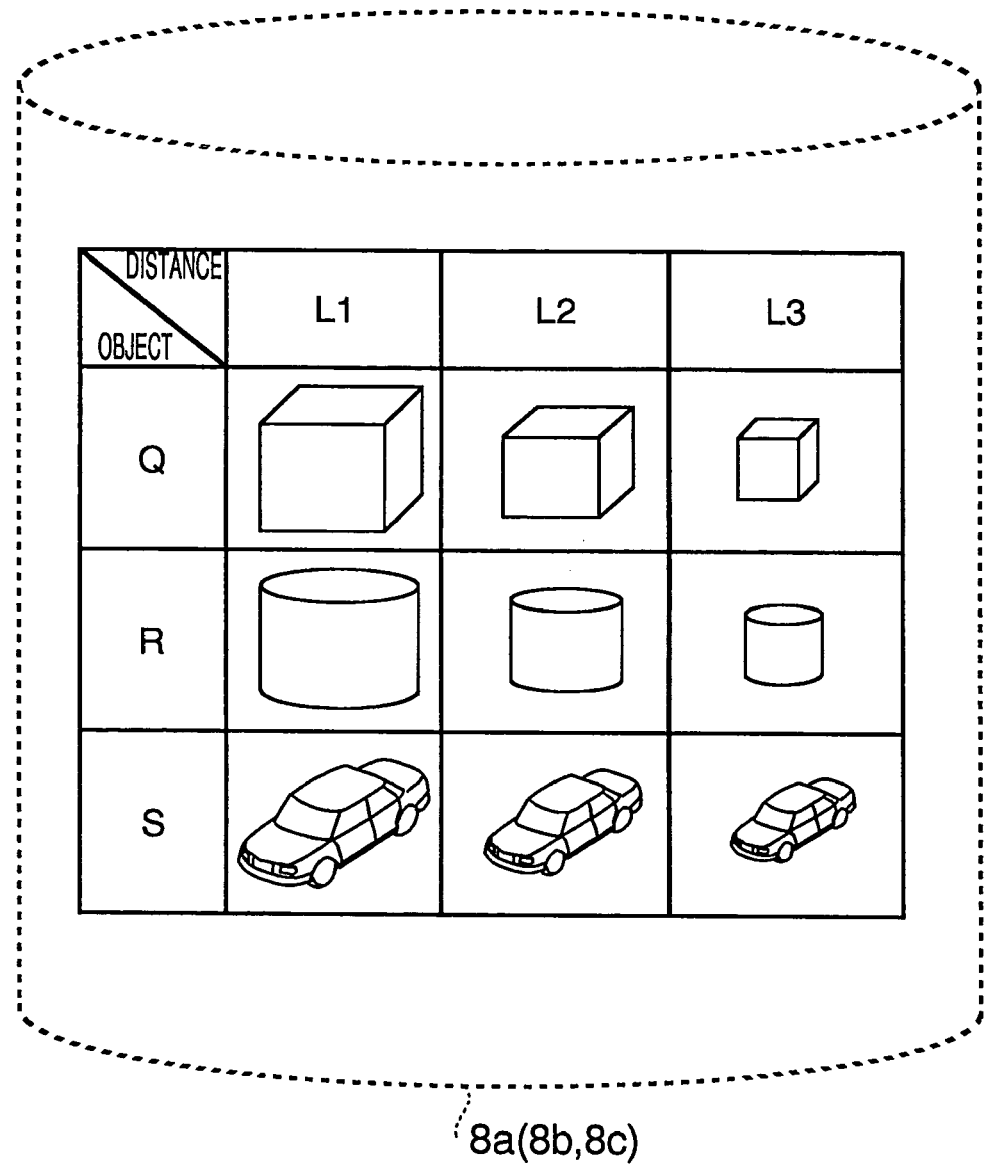
FIG. 7 is a drawing showing examples of data about models registered in a database.

Decision section 45 decides the input integrated information showing the highest similarity (and its class) from among the information pieces input from input integrated information decision section 44. That is, decision section 45 regards the position of the pattern decided to have the highest similarity as the information of the vehicle position. Similarly, decision section 45 also acquires information about the type of the object corresponding to the pattern that has been decided to have the highest similarity and information on a rough distance to the object. To acquire information on the distance to the object using pattern matching, the information of models (feature vector) registered in the database should contain distance data as shown in FIG. 7.

These decision results are output from result output section 46.

The object recognition technique using pattern matching described above will be explained more specifically using an example in FIG. 3.

Here, suppose pictures of the object are taken by camera 1a of the three cameras 1a to 1c.

Figure 3:
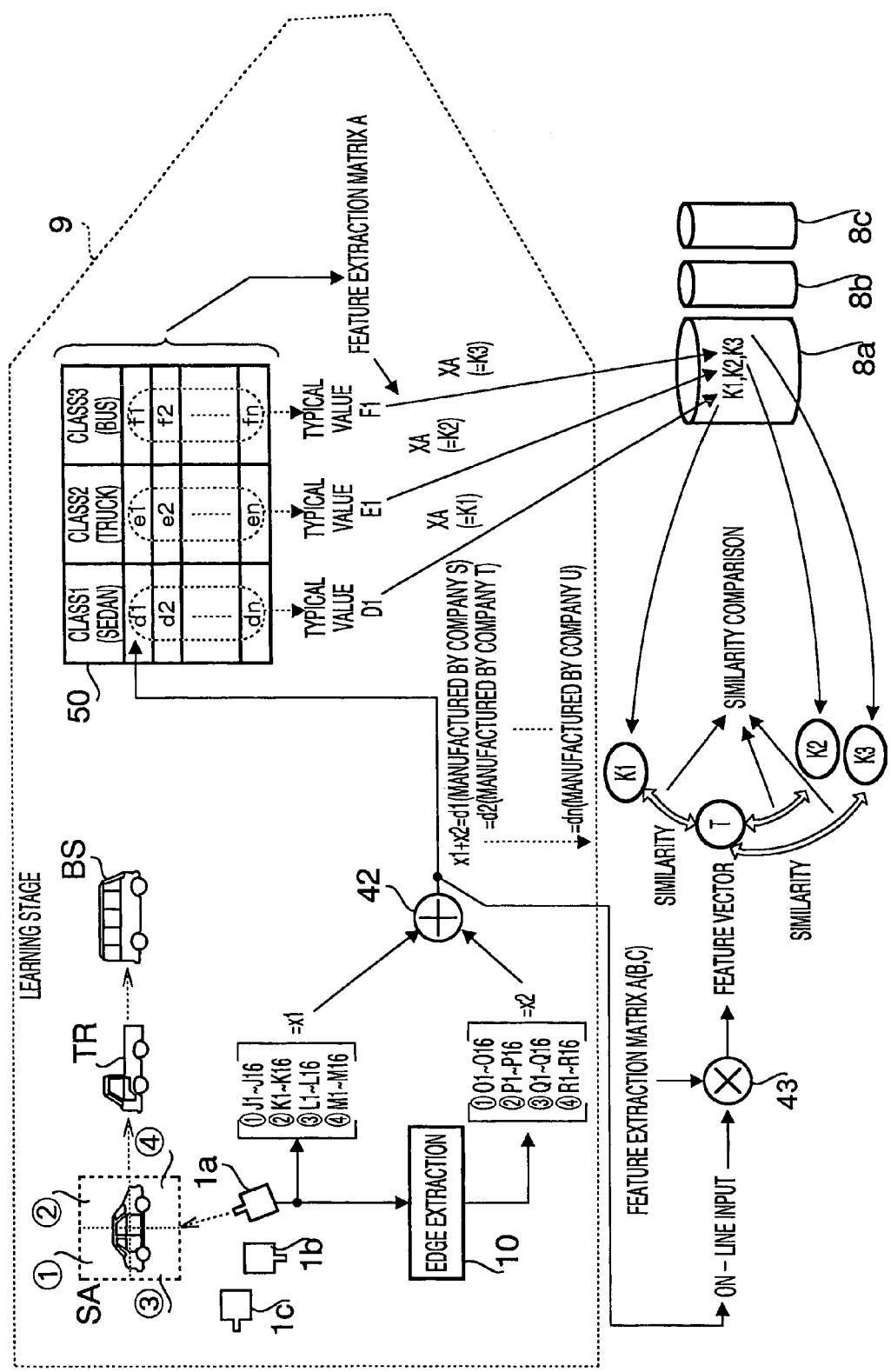
FIG. 3 is a drawing to specifically explain a database creating procedure and object recognizing procedure.

Furthermore, as shown at the top left of FIG. 3, suppose three types of a sedan (SA), truck (TR) and bus (BS) as the targets of picture taking. Also suppose the image obtained from the picture taking consists of four blocks ① to ④. One block is made up of 16 pixels (4 pixels×4 pixels), for example.

Pixel values (take a value between 0 and 255 if a brightness value is assumed to be of 256-gradation) of the pixels of the image obtained from pictures of the sedan (SA) taken by camera 1a are arranged in the order of pixels and assumed as a one-dimensional vector (x1). In FIG. 3, suppose pixel values ("0 to 255") of 16 pixels of block ① are J1 to J16, pixel values of 16 pixels of block ② are K1 to K16, pixel values of 16 pixels of block ③ are L1 to L16 and pixel values of 16 pixels of block ④ are M1 to M16.

Moreover, pixel values of pixels for an image obtained by applying edge extraction processing by edge extraction processing section 10 to the same image data are arranged in the order of pixels and assumed to be a one-dimensional vector (x2). In this case, suppose pixel values ("0 to 255") of 16 pixels of block ① are O1 to O16, pixel values of 16 pixels of block ② are P1 to P16, pixel values of 16 pixels of block ③ are Q1 to Q16 and pixel values of 16 pixels of block ④ are R1 to R16. By the way, one-dimensional vectors x1 and x2 are created by information creation section 41 in FIG. 2.

Then, information integration section 2 simply connects one-dimensional vectors x1 and x2 to obtain an integrated vector (d1=x1+x2).

For example, integrated vector d1 is the image data related to a sedan manufactured by company S (grouped as class 1). Likewise, integrated vectors d2 . . . dn are obtained for sedans manufactured by company T . . . company U. Integrated vectors d1 to dn are stored in learning integrated information database 50 as image data related to class 1.

The above processing is also carried out on the image data acquired by taking pictures of trucks and buses and the integrated vectors obtained (e1 to en, f1 to fn) are stored in learning integrated information database 50.

Integrated vectors e1 to en are image data related to class 2 (truck) and integrated vectors f1 to fn are image data related to class 3 (bus).

Then, values of integrated information vectors representing the respective classes (typical values) are obtained. For example, arithmetic averages of pixel values about respective pixels ① to ④ shown at the top left of FIG. 3 are calculated and vectors expressed in the average values of the respective pixel values are regarded as representative vectors (typical values) of their respective classes. The typical values of class 1 to class 3 obtained in this way are regarded as D1, E1 and F1.

On the other hand, by analyzing the data stored in learning integrated information database 50 and statistically processing variance, etc., feature extraction matrix A is calculated. The more specific calculation method for feature extraction matrix A will be described later.

Then, by multiplying a typical value of each class (D1, E1, F1) by feature extraction matrix A, a feature vector is calculated for each class. FIG. 3 shows feature vectors for the respective classes as K1, K2 and K3, which are obtained by multiplying the typical values by feature extraction vectors A related to class 1 (sedan).

These feature vectors (K1, K2 and K3) are stored in feature vector database 8a corresponding to camera 1a.

Similar processing is also applied to an image taken by camera 1b, a feature vector is acquired and stored in feature vector database 8b corresponding to camera 1b. Furthermore, similar processing is also applied to an image taken by camera 1c, a feature vector is acquired and stored in feature vector database 8c corresponding to camera 1c. This completes processing in the learning stage.

Then, pattern matching is actually performed and actual processing of recognizing an object will be explained with reference to the description in the lower part of FIG. 3.

Here, suppose a case where image data taken by camera 1a is input in real time. First, the aforementioned processing is applied to the image data taken by camera 1a and an integrated vector is created. Then, feature vector extraction section 43 multiplies the integrated vector by feature extraction matrix A for camera 1a. As a result, feature vector T is obtained.

Next, input integrated information decision section (similarity calculation section) 44 compares feature vector T with feature vectors related to class 1 (K1, K2, K3) and examines the similarity of the numerical array pattern. Each similarity is sent to decision section 45 and decision section 45 selects the class with the highest similarity.

For example, in the case where the object taken by camera 1a is a sedan (class 1), the similarity to feature vector K1 corresponding to class 1 is highest, whereas the similarity to other two feature vectors K2 and K3 must be extremely low. This allows the object to be recognized with extremely high precision and at high speed. That is, the fact that the object existing in the image is a sedan that belongs to class 1 is detected in real time.

Furthermore, as schematically shown in FIG. 7, pictures of one object (Q, R, S) are taken with a varying distance from the camera (divided into three cases of distance L1, L2 and L3 in FIG. 7) and image patterns of the respective objects (feature vectors of objects) are registered in the learning database, and it is thereby possible to identify the matched model through pattern matching and at the same time estimate a rough distance from the camera.

For example, when a plurality of cameras 1a to 1i are mounted on the vehicle to take pictures in different directions, a learning database as shown in FIG. 7 needs to be created for every camera. At this time, to construct a learning database, a plurality of cameras shown in FIG. 13 need not always be provided. That is, it is also possible to adopt a method of taking pictures of objects in different directions by one camera and registering the model data shown in FIG. 7 in the databases corresponding to the respective directions of picture taking.

Then, a procedure for creating feature vector databases 8a, 8b and 8c for their respective cameras will be explained more specifically using FIG. 4 and FIG. 5.

Figure 4:
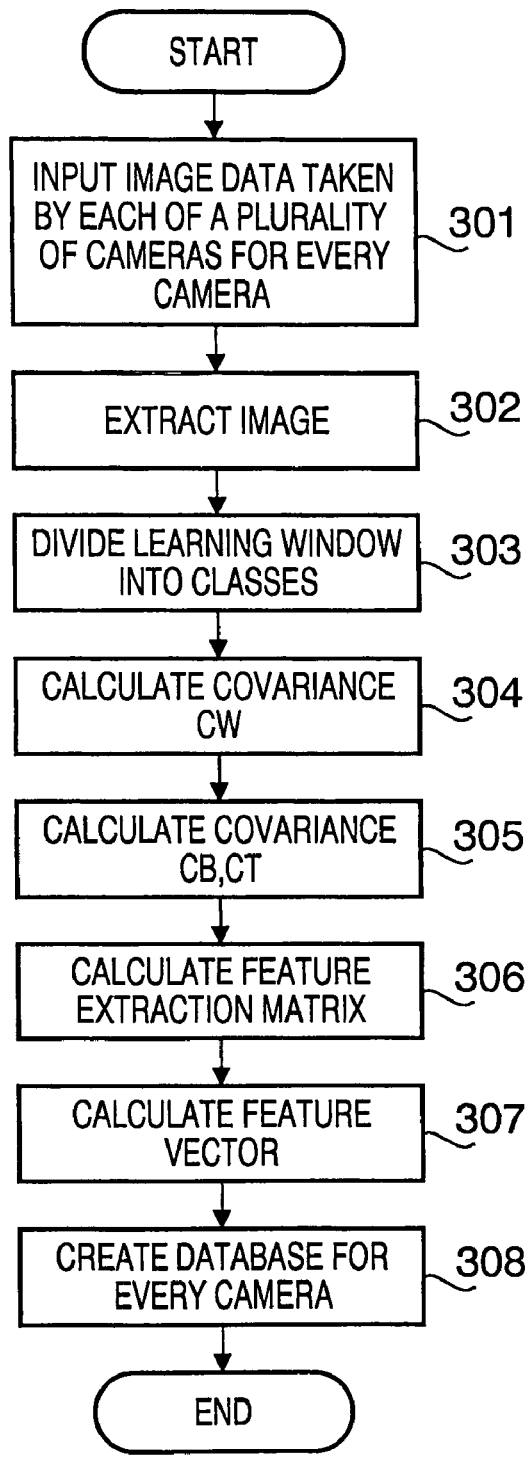
FIG. 4 is a flow chart showing an example of the database creating procedure.
Figure 5:
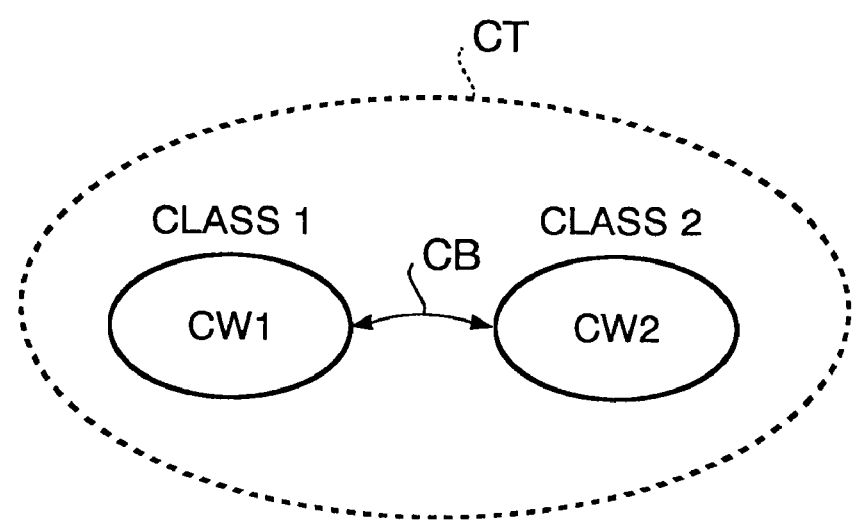
FIG. 5 is a drawing to explain the contents of database creating processing (processing to calculate covariance)

FIG. 4 shows an outline of a procedure for creating learning database 49 (feature vector databases 8a, 8b and 8c).

First, image data taken by a plurality of cameras 1a to 1c is input for every camera (step 301). Then, search range focusing section 5 focuses the search range. In this way, images for pattern matching are extracted. Next, as explained in FIG. 3, integrated vectors, which are obtained based on images taken by the respective cameras, are obtained and stored in learning integrated information vector database 50 (step 302). The integrated vectors obtained are the image data, which become the basis for calculating feature vectors (these are called "learning windows").

Next, the learning windows stored in learning integrated information vector database 50 are grouped into a plurality of classes (step 303).

Then, covariance CW is obtained for every class (step 304). Covariance CW indicates a set of image data, which belongs to one class as shown in FIG. 5.

Then, covariance CB and covariance CT are obtained. As shown in FIG. 5, covariance CB indicates the degree of separation between covariance (CW1) of one class and covariance (CW2) of another class. On the other hand, covariance CT indicates integration about image data of all classes.

Next, a feature extraction matrix is calculated based on the covariance obtained (step 306). Then, a feature vector is obtained by multiplying the learning image data stored in learning integrated information vector database 50 in FIG. 2 by the feature extraction matrix (step 307). Then, learning database 49 (feature vector databases 8a to 8c) is created for every camera (step 308).

Figure 6:
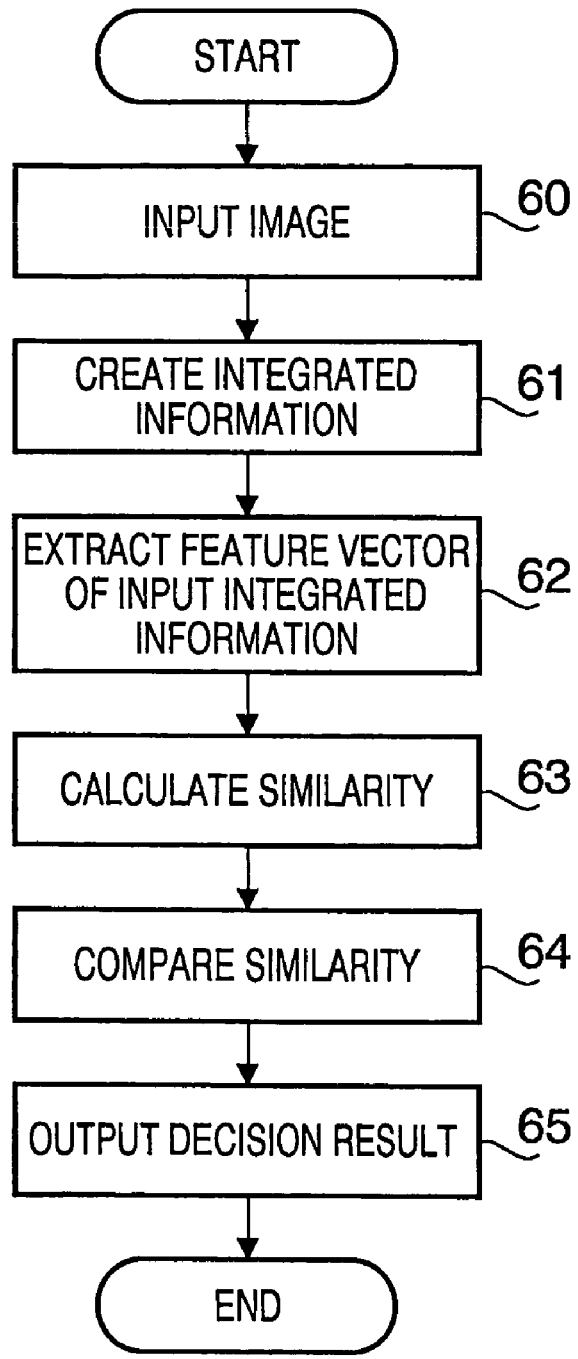
FIG. 6 is a flow chart showing an object recognizing procedure.

Next, the actual object recognition procedure using created learning database 49 will be explained using FIG. 6.

First, an image is input (step 60) and integrated information is created (step 61). Then, an input integrated information feature vector is extracted (step 62).

Then, the input integrated information feature vector is compared with the feature vector registered in the database, the similarity is calculated (step 63) and a comparison is made between the calculated similarities and the highest similarity is detected (step 64). The information on the object obtained by this detection (information on the type of the object, information on the class to which the object belongs, information on a rough distance to the object, etc.) is output (step 65).

The above example describes the method of grouping objects into a plurality of classes and calculating similarity in class units, but this embodiment is not limited to this. That is, it is also possible to adopt a method of matching objects with individual models without grouping objects into classes or a method of directly matching between image data items without extracting features.

In addition to the method using pattern matching, there are also other methods of locating an object in an image. For example, a method using edges of an object is available. An example of detection of the position of an object using edges is disclosed in the Unexamined Japanese Patent Publication No. HEI8-94320 "Mobile Object Measuring Device". The position detected in this way is used as positional information.

Then, the method of calculating the distance to an object in a real space (the operation of distance calculation section 7 in FIG. 1) will be explained.

Distance calculation section 7 in FIG. 1 calculates the distance to an object in the real space based on the positional information obtained by object recognition section 6 and outputs as a measurement result.

As examples of the system of calculating the distance to an object, the following four techniques (1st to 4th system) are available. However, since it is necessary to minimize the number of cameras and reduce the amount of image data to be processed, it is desirable to use the 2nd or 4th system in the present invention, which is capable of calculating the distance to an object in a three-dimensional space using one camera.

Figure 26:
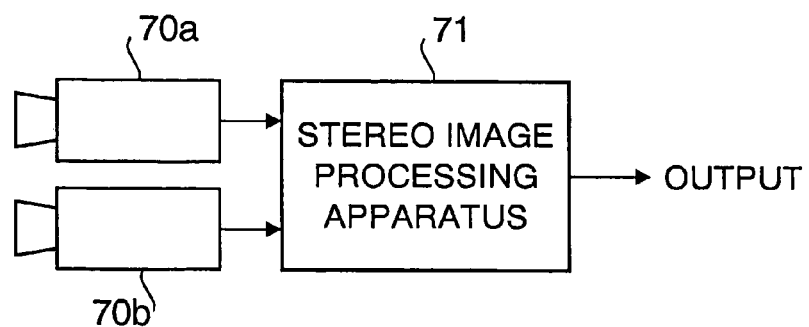
FIG. 26 illustrates a configuration of an apparatus to carry out stereo picture taking and measure the distance to an object in a three-dimensional space.

The 1st system uses stereo images. FIG. 26 shows a configuration of an apparatus for stereo picture taking. This apparatus finds a location suitable for calculating the distance from within the detected object (e.g., a location specific to the object), determines the position of the specific location, and thereby calculates the distance and uses this as the measurement result.

The second system is a method of calculating the distance using a ground surface structure viewed from one plane. This method is an effective method since information on the actual shape of the ground can be used effectively or the calculation method is relatively simple and high measuring accuracy is attained.

Figure 11:
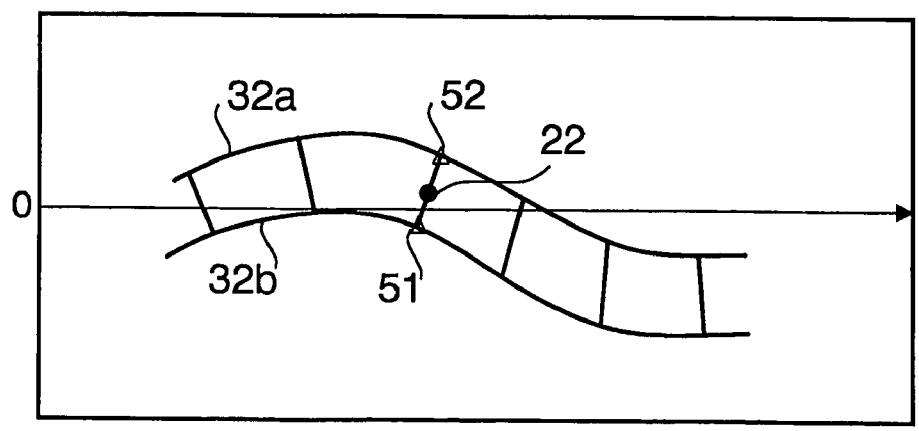
FIG. 11 is a drawing to explain a method of measuring the distance from an image taken by one camera to an object in a real space (three-dimensional space)

That is, as shown in FIG. 11, the path lines (correspond to white lines indicating the both ends of the road) 32a and 32b in the image are detected first and the ground structure in the real space is reconstructed based on this. An example of the reconstruction method is disclosed in the document "Reconstruction of Road Shape by Local Plane Approximation" (Watanabe et al., Technical Report of IPSJ CV62-3).

Then, the position of an object in the three-dimensional space is determined by combining the position of the object (e.g., vehicle) and the three-dimensional structure of the ground surface. That is, the positions of the right and left path lines (reference numerals 51 and 52) corresponding to the detected object are found on the premise that the object exists in the area between the two path lines 32a and 32b, and the object (e.g., position of the vehicle) on the reconstructed three dimensional structure of the ground surface (road structure) is determined. Then, the distance to the object in the real space is calculated and used as the measurement result. This system is extremely effective and will be explained in detail later using FIG. 18 to FIG. 25.

The 3rd system is the one using laser radar. In this system, a location (location specific to an object; e.g., the position of a number plate of a vehicle) suited to calculation of the distance based on the detected position of the object is found, the distance corresponding to the position is calculated by laser radar and used as the measurement result.

Figure 10:
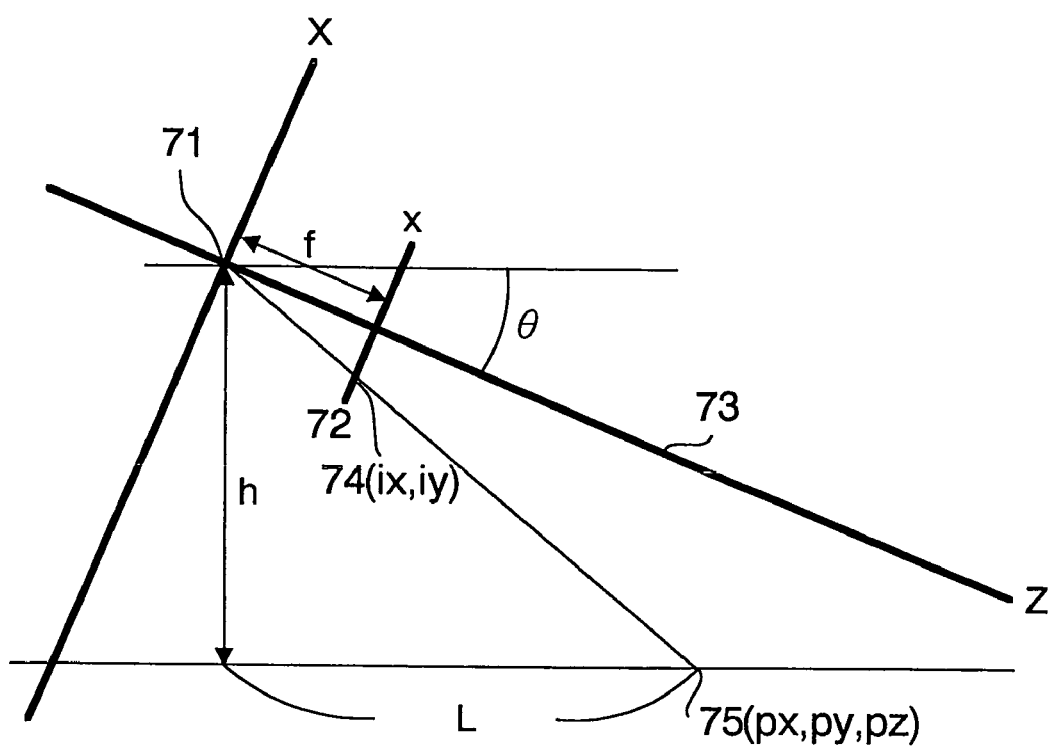
FIG. 10 is a drawing to explain an example of a method of calculating the distance to an object.

The 4th system uses an assumption that the ground surface between the camera and object detected is horizontal. As shown in FIG. 10, assuming that camera parameters (focal distance f, height in the center of the lens h, angle θ formed by the horizontal direction and camera optical axis θ) are known, if the position of the detected object is (ix, iy), the position 75 in the real space is calculated from expression (1).

$$px=(h \cdot ix)/\{f \sin \theta - ix \cdot \cos \theta\}$$

$$py=(h \cdot iy)/\{f \sin \theta - ix \cdot \cos \theta\}$$

$$pz=(h \cdot f)/\{f \sin \theta - ix \cdot \cos \theta\} \quad \text{(Expression 1)}$$

Distance L is calculated from this coordinate position and this is the distance to the object obtained.

As described above, according to this embodiment, a database of object models is registered for each camera beforehand and the highest similarity between the respective images from a plurality of cameras and the data of object models registered in each camera is determined, and thereby the position of the object in the image and type of the object are recognized or a rough distance to the object is estimated.

It is also possible to calculate the distance from the camera to the object in the real space based on the information indicating the position in the photographed image at which the object identified by pattern matching is located.

Furthermore, regarding recognition of an object, one database exists per one camera and the database to be used is determined according to the camera used. This eliminates the need to search other databases corresponding to the other cameras, providing extremely efficient object recognition processing. That is, it is possible to speed up object recognition processing.

Furthermore, the database to be used is determined according to the camera to be used and other databases corresponding to the other cameras need not be searched, which produces an effect of reducing erroneous recognition.

For example, suppose model A is registered in feature vector database 8a corresponding to camera 1a, and likewise model A' which is similar to model A (however, model A and model A' are different objects) is registered in feature vector database 8b corresponding to camera 1b. In the case of one database, all models registered in the database are searched and model A' may be matched though model A should be matched originally and there is a possibility that objects will be erroneously recognized. In contrast, the present invention determines a database to be searched in accordance with one camera, thereby reduces the number of models to be searched and only compares between images taken by the same camera and can thereby reduce the probability of making erroneous decisions as described above.

More specifically, suppose camera 1a is a camera dedicated to taking pictures of the right side of the road and camera 1b is a camera dedicated to taking pictures of the left side of the road. In this case, a traffic signal model obtained when camera 1a takes pictures of a traffic signal pole at the right end of the road may quite resemble a utility pole model obtained when camera 1b takes pictures of a utility pole at the left end of the road. In this case, the traffic signal pole may be conventionally mistaken for the utility pole. However, such misjudgment does not occur with the present invention. Thus, the present invention also improves the accuracy of pattern matching.

That is, the present invention allows efficient and accurate detection of objects (vehicles, etc.). The present invention produces an effect of making it possible to measure the distance to the object. The present invention also produces effects of contributing to reduction of the burden on hardware of the apparatus and shortening of the processing time.

Embodiment 2

Figure 8:
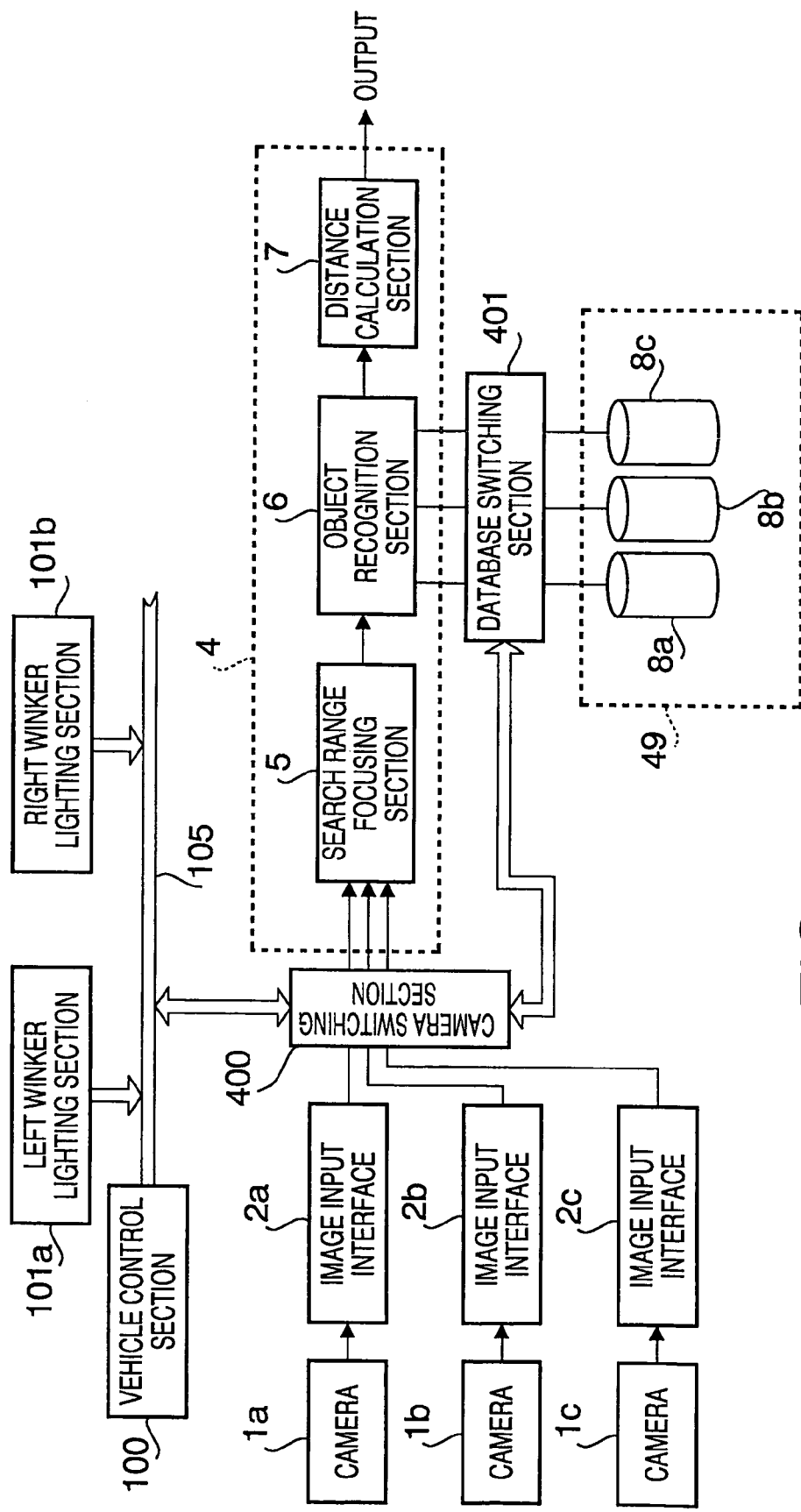
FIG. 8 is a block diagram showing another example of a configuration of the object recognition apparatus (including a distance calculation section) of the present invention.

FIG. 8 shows another example of the object recognition apparatus of the present invention.

The basic function and operation thereof are the same as those of the object recognition apparatus in FIG. 1. In FIG. 8, the same sections as those in FIG. 1 are assigned the same reference numerals.

However, the apparatus in this embodiment is mounted on a vehicle and configured to switch between cameras and databases to be used using control information from a vehicle control section as appropriate.

In FIG. 8, vehicle control section 100 controls the operation of various electronics devices via control bus (BUS) 105. For example, vehicle control section 100 instructs winker lighting sections 101a and 10b to blink the right or left winker.

Camera switching section 400 watches a control signal issued by vehicle control section 100, detects the actual operation condition of the vehicle and selects image data to be supplied to image processing section 4 from among image data taken by three cameras 1a to 1c according to the detection result.

For example, when the left winker is blinking, the usability of information from the camera taking pictures of the right side of the vehicle is generally low, and therefore the image data from the camera taking pictures of the left side is selected.

Furthermore, database switching section 401 automatically selects feature vector database 8a, 8b or 8c corresponding to the selected camera in connection with the operation of camera switching section 400.

Thus, switching between the cameras and databases to be used making full use of control information of the vehicle provides efficient object recognition processing and distance measuring processing.

Embodiment 3

Figure 9:
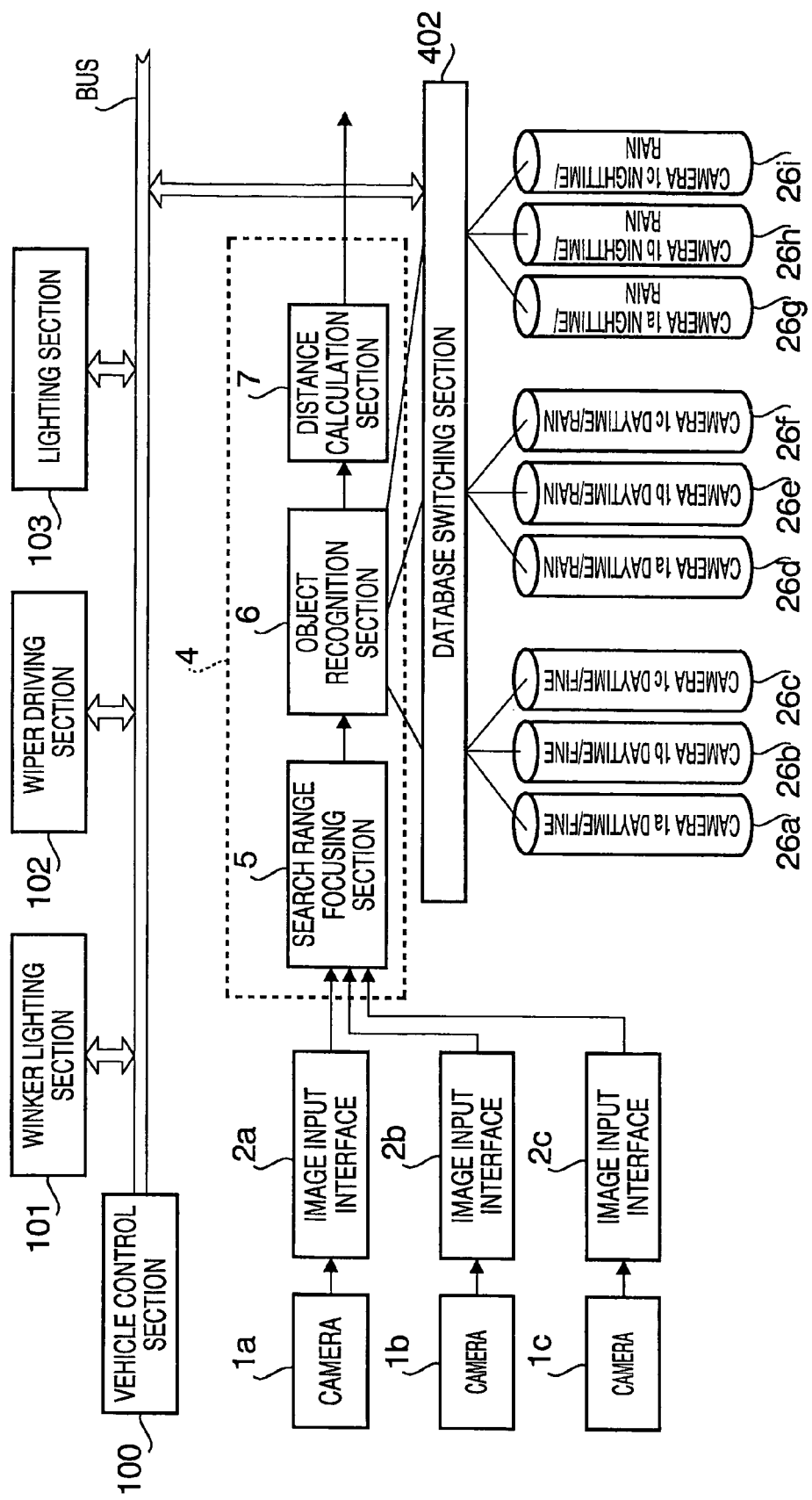
FIG. 9 is a block diagram showing another example of a configuration of the object recognition apparatus (including a distance calculation section) of the present invention.

FIG. 9 illustrates another example of the object recognition apparatus of the present invention. As in the case of Embodiment 2, this embodiment assumes that the object recognition apparatus is mounted on a vehicle.

As in the case of Embodiments 1 and 2, this embodiment is also provided with databases in association with one camera. However, this embodiment differs from the above-described embodiments in that a plurality of databases is provided in association with one camera.

That is, this embodiment provides a plurality of databases based on the actual situation of objects to be recognized and conditions imposed on the objects, etc. This embodiment automatically switches between databases according to surrounding situations, etc.

Here, the conditions for switching between databases include daytime and nighttime, time, weather, brightness, etc. and in this case, data is selected according to the situation at each moment. It is also possible to use different databases when the vehicle is running on a highway or when the vehicle is running on other roads.

Moreover, in the case of a vehicle running on a road, there can be cases where some conditions are added to driving of the vehicle in special places or regions. For example, there is a case where the vehicle is imposed a condition that the vehicle should run with its lights ON even during the daytime in a specific region such as a region prone to fogs. In that case, it is possible to use a technique of downloading database information suited to driving in the region when the vehicle is passing through an ITS automatic toll gate and changing the databases every time the driving condition changes.

In the case of FIG. 9, the apparatus is provided with feature vector databases 26a and 26b used in the case of daytime or fine weather, feature vector databases 26d to 26f used in the case of daytime and rain and feature vector databases 26g to 26i used in the case of nighttime and rain in association with cameras 1a, 1b and 1c.

That is, this means that three databases are provided for one camera. That is, in addition to the condition of every camera, this embodiment has another condition when databases are used.

The basic configuration, function and operation of the object recognition apparatus in FIG. 9 are almost the same as those of the apparatus in FIG. 8.

Vehicle control section 100 sends a control signal to winker lighting section 101, wiper driving section 102, lighting section 103, etc. via control bus (BUS) 105. Database switching section 402 monitors the control signal issued from vehicle control section 100, estimates the current driving environment of the vehicle from the control signal and automatically selects a database according to the environment.

For example, in the case where the windshield wiper is operating and lights are ON, it is understood that the vehicle is driving in an environment of night and rain. When object recognition processing is carried out on an image taken by camera 1a, feature vector database 26g, which is imposed with an operating condition of night and rain is therefore selected.

As described in this embodiment, the technique of providing a database for every surrounding environment or condition and selecting a database suited to the environment or condition is extremely effective to improve the accuracy of object recognition and further improve the reliability of measured distance, etc.

That is, even if images of an object are taken by the same camera, the way how the object appears may change considerably depending on the weather and picture taking time, etc. Thus, changing the databases so as to suit conditions during actual operation can improve the accuracy of object recognition significantly.

Embodiment 4

A technique of supporting driving by mounting the object recognition apparatus on a vehicle will be explained specifically using FIG. 12 to FIG. 26 below.

Figure 12:
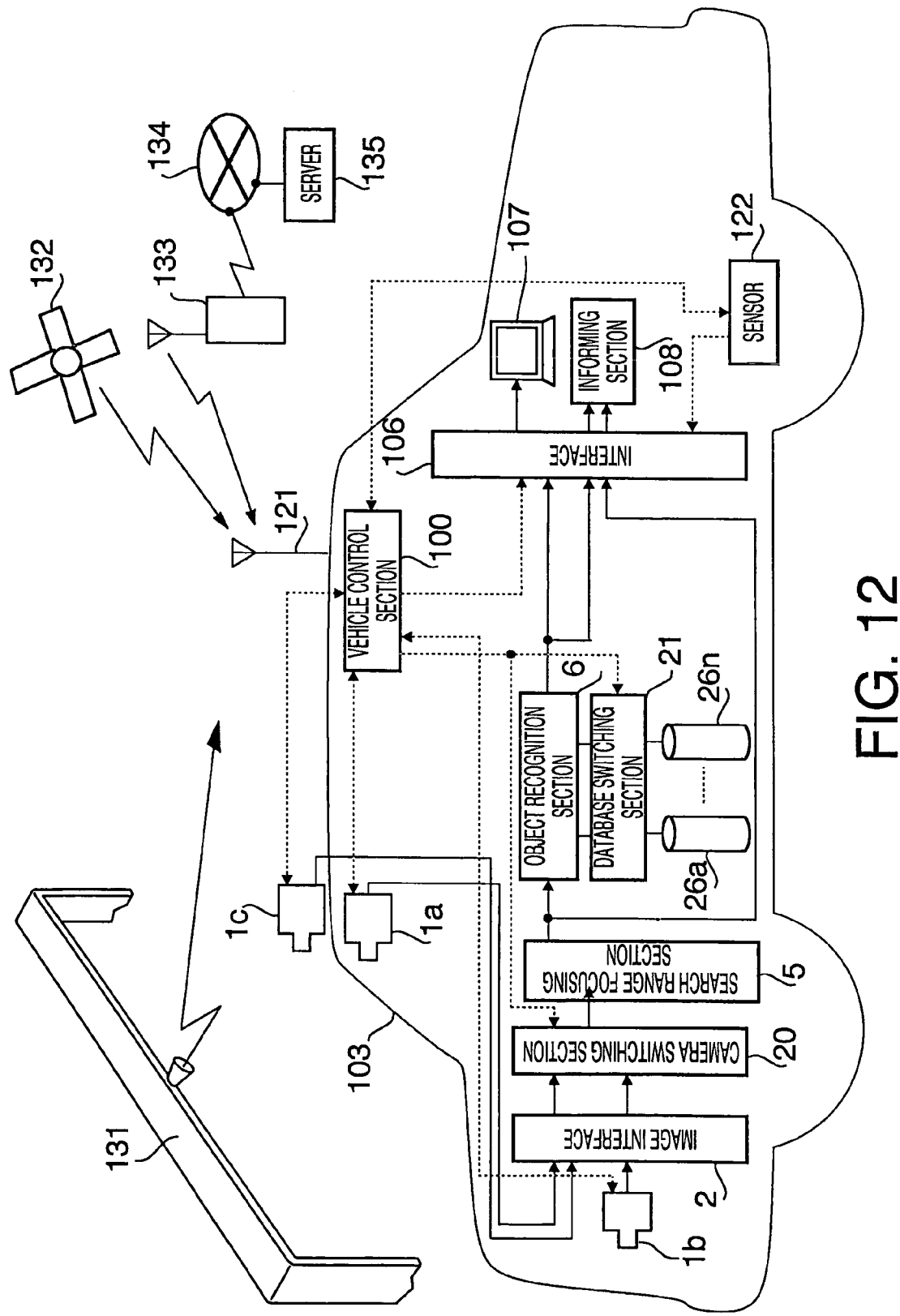
FIG. 12 is a block diagram showing an example of the object recognition apparatus (without including the distance calculation section) of the present invention installed in a vehicle.

FIG. 12 illustrates an example of applying to sedan 130 almost the same configuration as the configurations of the foregoing embodiments of the present invention. The parts common to those in FIG. 1 and FIG. 8 are assigned the same reference numerals.

What should be noted in the configuration shown in FIG. 12 is that the useful information resulting from the object recognition processing is informed to the driver via monitor 107 and informing section 108, the components of the image processing apparatus (image input interface 2, camera switching section 20, search range focusing section 5, database switching section 21, object recognition section 6, road structure recognition section 120 and distance calculation section 7) are implemented by software and feature vector databases 26a to 26n and information on the components of the image processing apparatus are allowed to be downloaded from the outside.

In the object recognition apparatus in FIG. 12, vehicle control section 100 can appropriately control which of the images taken by cameras 1a, 1b and 1c should be subjected to object recognition, for example. Normally, it is realistic that a plurality of cameras 1a to 1c is selected sequentially by time sharing and vehicles coming closer to the own vehicle are constantly and automatically monitored.

By the way, vehicle control section 100 is supplied with information indicating the driving environment (e.g., it is raining or night) and driving condition (miles per hour, whether the vehicle is running straightforward or curving, etc.) as appropriate.

Based on various kinds of information input, vehicle control section 100 sends a control signal to change databases to database switching section 21.

Switching of camera switching section 20 can also be performed using a car navigation system or GPS information. For example, in the case where the driver operates the right winker while the car navigation system is instructing the driver to make a right-hand turn at an intersection, camera switching section 20 selects the camera to take pictures in the rightward direction of the own vehicle to perform vehicle recognition corresponding to right-hand turning (detection of surrounding vehicles at an intersection). On the other hand, in the case where the driver operates the right winker on a straight-ahead road while the car navigation system is instructing the driver to move straight ahead, camera switching section 20 selects the camera to take pictures in the right backward direction of the own vehicle to perform vehicle recognition corresponding to make a rightward lane change (detection of vehicles coming closer in the right backward direction). Furthermore, camera switching section 20 changes cameras sequentially by time sharing to recognize vehicles coming closer.

Furthermore, in the object recognition apparatus in FIG. 12, image data output from search range focusing section 5 and information indicating the object recognition result output from object recognition section 6 (including the information of distance to the object estimated by using a database as shown in FIG. 7) are sent to interface circuit 106.

Moreover, the information acquired by sensor 122 and control information output from vehicle control section 100 are also given to interface circuit 106.

Then, information necessary for the driver is notified to the driver via monitor 107 and informing section 108.

Figure 14A:
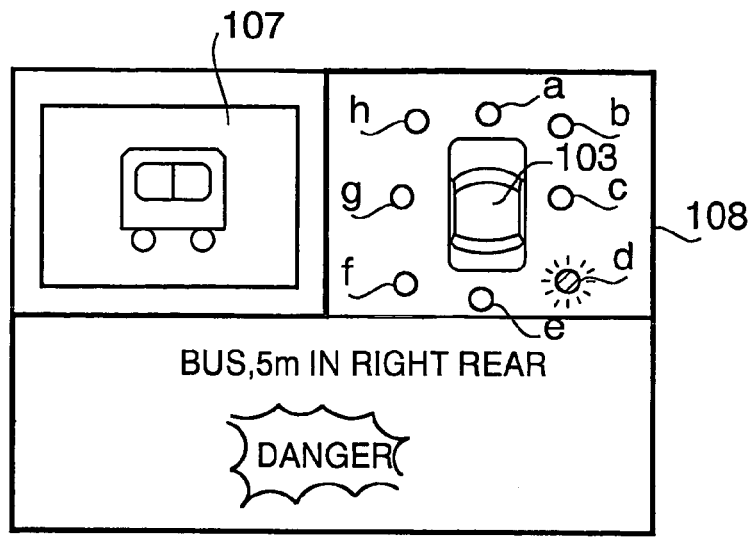
FIG. 14A shows an example of a mode of providing the driver with driving support information.

An example of an image appearing on monitor 107 in FIG. 12 and an example of information supplied to the user by informing section 108 in FIG. 12 are shown in FIG. 14A.

In FIG. 14A, a bus is coming closer at a distance of 5 m in the right backward direction and the monitor is informing the driver by means of characters that it is dangerous to make a lane change. In addition to the characters, the directional information of "Right backward direction" is also informed by informing section 108 blinking a lamp as shown at the top right of FIG. 14A.

That is, in the informing section 108, a plurality of lamps a to h corresponding to the positions of a plurality of cameras is placed around the own car 103. In FIG. 14A, lamp d at the bottom right is blinking, which visually shows that a vehicle is coming closer from the right backward direction.

FIG. 14A shows an example of informing by means of a display, but this embodiment is not limited to this and it is rather desirable to positively adopt various informing methods appealing to the human five senses or combine those methods.

That is, the present invention allows objects to be recognized in real time using a plurality of cameras. That is, it is possible to acquire information of various directions and the amount of information available is by far greater than conventional arts.

However, that would rather mislead the driver. That is, when a danger sign indicating that "a vehicle is coming closer from the right backward direction" is given, the driver might be unable to understand the right backward direction instantaneously and make a wrong decision, which would rather lead to a serious accident.

Thus, it is of extreme importance to inform the information acquired to the driver in a manner without misleading the driver.

Therefore, this embodiment adopts a method of appealing to the fives senses other than visual perception, which is at the same time a method of informing the driver that allows the driver to instantaneously understand with three-dimensional senses which camera has taken the image on which the information is based together with notification using a panel display.

The notification methods appealing to the five senses other than visual perception are as follows.

Notification by sound: That is, notification of information content using direction, high or low, loud or small, rhythm, melody, uncomfortable sound, etc., or combination thereof.

Notification by voice: That is, notification of information content using tone of voice, etc.

Notification by vibration: That is, notification of information content using vibration intensity, vibration direction, vibration type, vibration speed, etc. or combination thereof.

Notification by illumination: That is, notification of information content using illumination intensity, illumination direction, illumination type, etc. or combination thereof.

Notification by odor: That is, notification of information content using odor intensity, odor direction, odor type, etc. or combination thereof.

Notification by wind: That is, notification of information content using airflow intensity, direction, type or speed etc. or combination thereof.

Figure 14B:
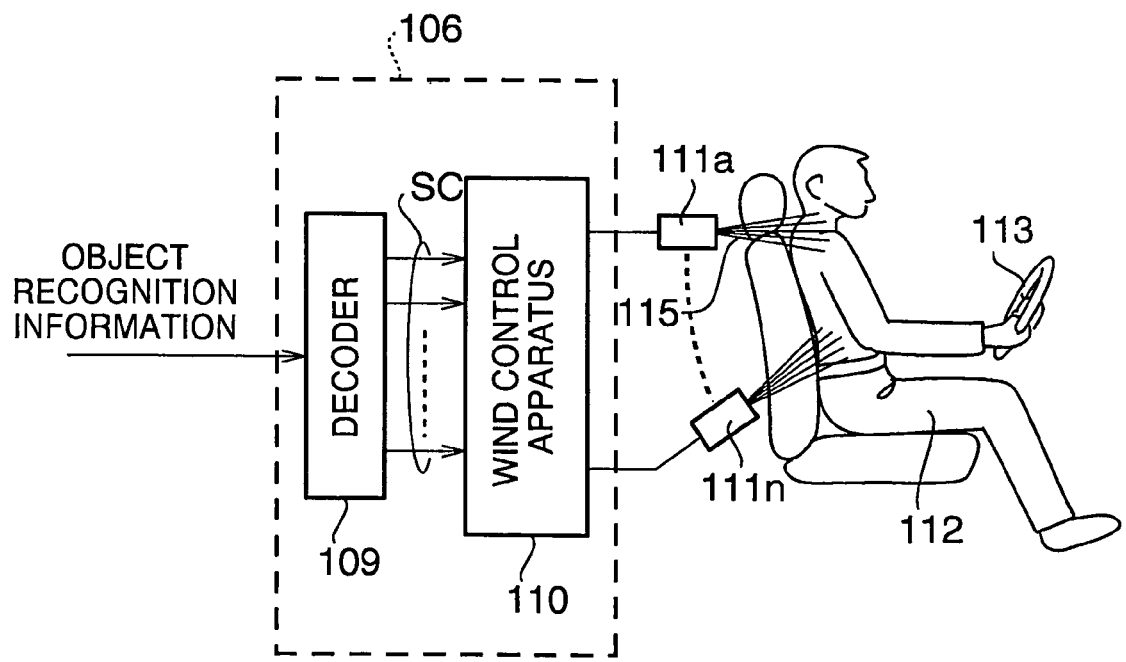
FIG. 14B shows another example of the mode of providing the driver with driving support information.

FIG. 14B shows a configuration of apparatus 106 using notification by wind. Apparatus 106 in FIG. 14B comprises decoder 109 that decodes object recognition information (including distance information) and outputs decode signal SC consisting of a plurality of bits and wind control apparatus 110 that receives record signal SC and sends control signals corresponding to a plurality of wind blowing section 111a to 111n.

Which of the plurality of wind blowing sections 111a to 111n will blow wind, how strong the wind is, how long the wind is blown or what the temperature of the wind is, etc. is controlled by a control signal output from wind control apparatus 110 as appropriate.

For example, when a vehicle is coming closer at high speed on the right hand side from behind the user, the wind blowing section blows a wind, which is strong but not obtrusive to the user, for a short time from the right hand side behind the user. On the contrary, when a vehicle is coming closer slowly on the right hand side from behind the user, the wind blowing section blows a wind, which is relatively weak, for a short time from the right hand side behind the user. Or another method can be used which expresses the distance to the target vehicle with the duration of the wind blowing. In all cases, it is preferable to adopt a notification method capable of efficiently and effectively allowing the user to image the content of output information.

Using these methods independently or in combination lets the user know essential information effectively in an easy-to-operate manner.

By the way, the notification method also includes the following. That is, a method of combining an alarm sound, voice and blinking of a display lamp. In this case, the user need not constantly watch the monitor but pay attention only when reminded, which alleviates the burden on the driver.

Dividing the monitor into portions, for example, each displaying each camera to allow the user to distinguish to which camera the image belongs according to the position displayed. As shown in FIG. 14A, there is also a method of showing the vehicle model on the monitor, etc. and urging the driver to watch the camera by blinking. Combining the two kinds of display (real image and modeled image (only when alarming on a danger)) as shown in FIG. 14A allows the user to know information efficiently and safely.

Figure 27:
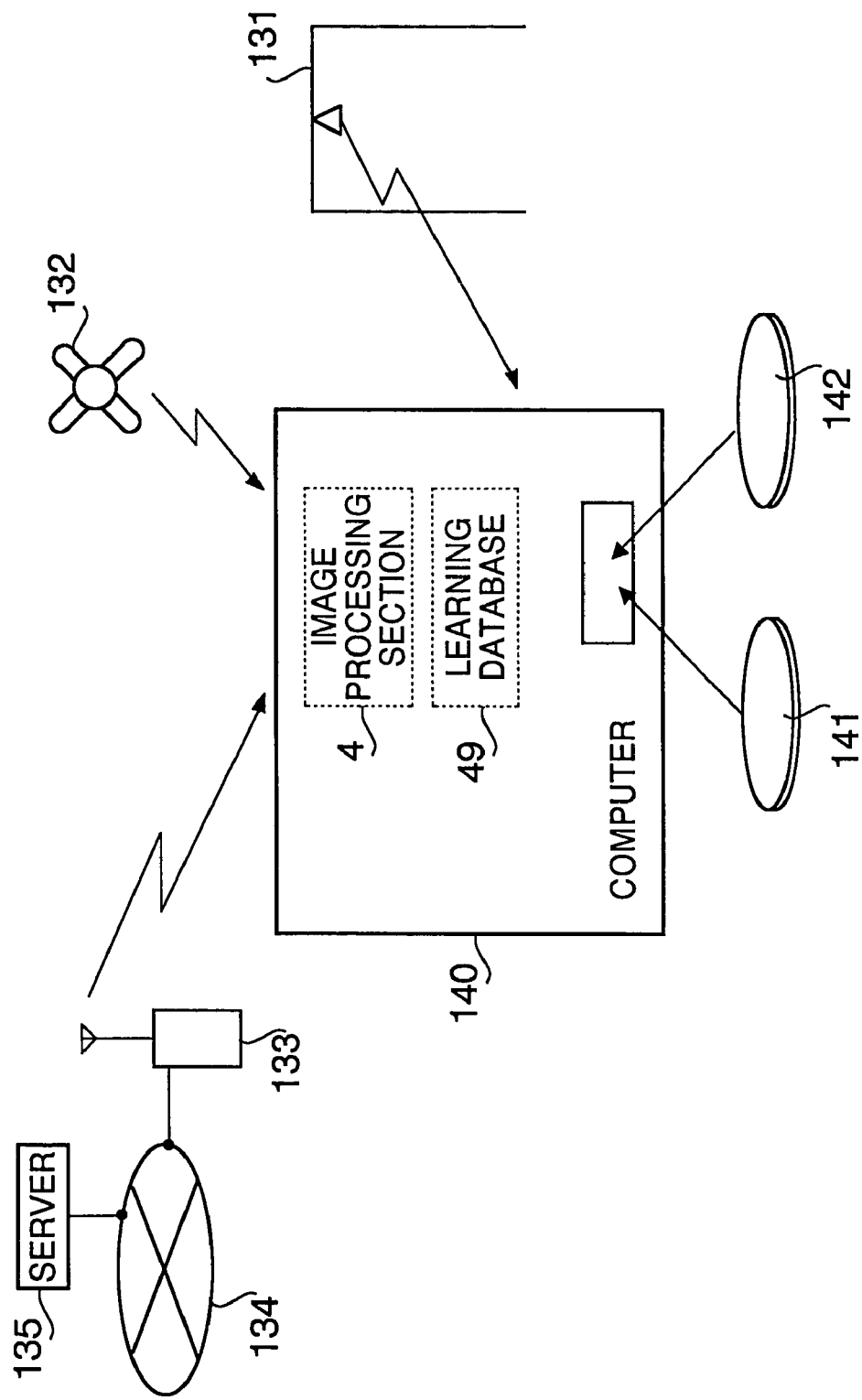
FIG. 27 is a drawing to explain a method of constructing the image processing section or a database of the present invention on a computer.

As shown in FIG. 27, camera switching section 20, search range focusing section 5 and object recognition section 6 in FIG. 12 can be constructed on computer 140 using software. Furthermore, learning database 49 storing the model data for object recognition can be incorporated in computer 140.

Image processing section 4 and learning database 49 (including feature vector databases 8a, 8b and 8c) can be constructed by setting recording media 141 and 142 such as CD-ROM storing necessary information and software in computer 140.

Furthermore, it is also possible to download information specific to the region from toll gate 131 by radio, download it together with data such as GPS from satellite 132 or download it from server 135 on a wide area network via radio base station 133.

Information on databases, etc. can be downloaded when the vehicle passes automatic toll gate 131 in the ITS system using radio communication as shown in the upper section of FIG. 12.

Furthermore, necessary information can also be supplied to vehicle 103 from satellite 132 by means of radio communication. Or it is also possible to extract necessary information from server 135 on wide area network 134 such as the Internet and send the information from cellular telephone base station (radio base station) 133 to vehicle 103.

In FIG. 12, the operations of cameras 1a, 1b and 1c, etc., camera switching section 20 and database switching section 21, etc. are controlled by vehicle control section 100 in a concentrated manner. Vehicle control section 100 is also given information of sensor 122 (e.g., a sensor to measure the rotation angle of the vehicle).

Figure 13:
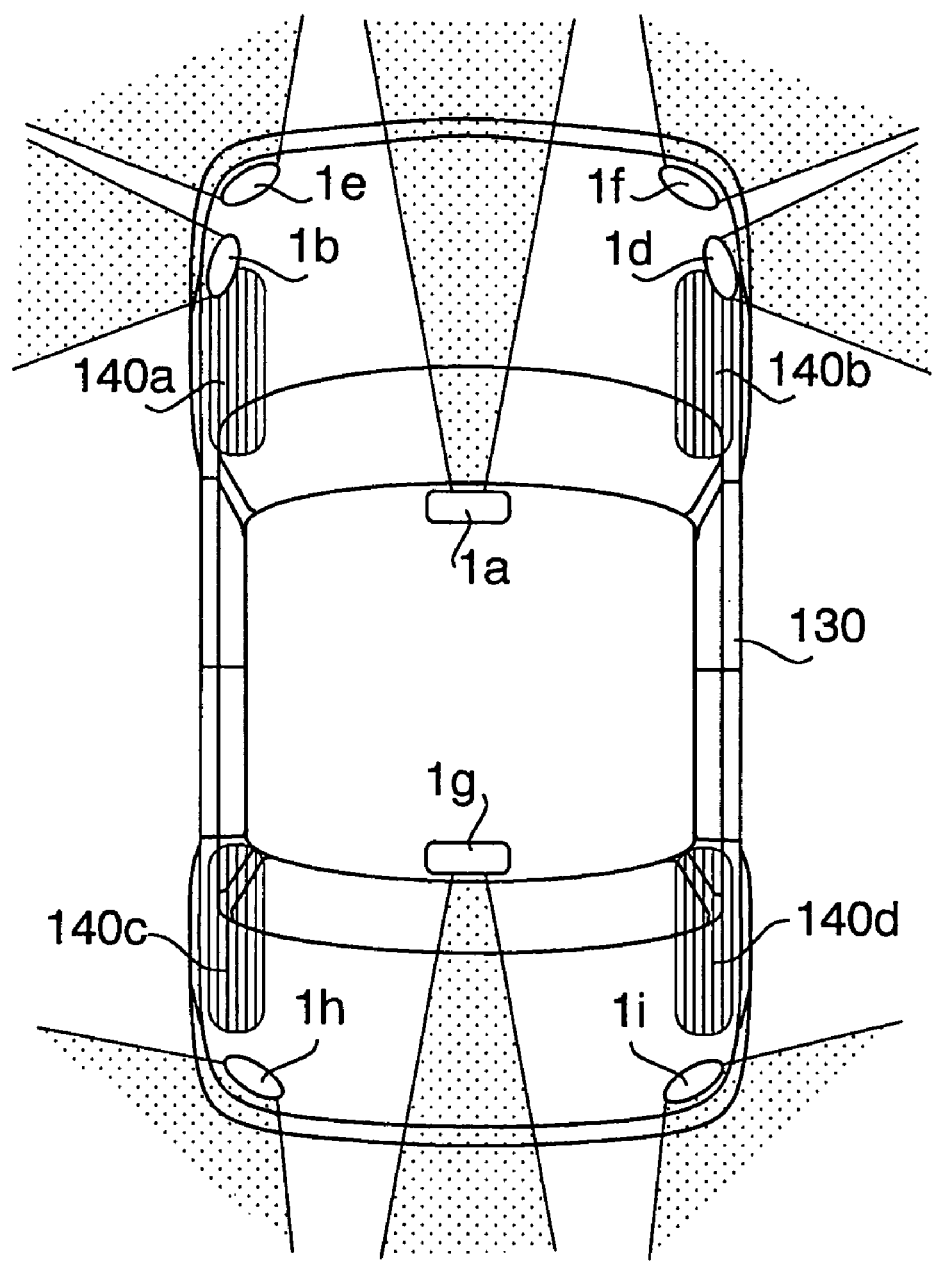
FIG. 13 is a block diagram showing an example of the locations of cameras mounted on the vehicle.

FIG. 12 only shows three cameras 12, but cameras 1a to 1i are actually placed so as to monitor the periphery of vehicle 130 as shown in FIG. 13.

In FIG. 13, reference numerals 140a to 140d denote tires. In addition, in FIG. 13, the shaded areas denote the coverage of the cameras.

The present invention allows three-dimensional distance measurement by a single camera without the need for stereo picture taking. Thus, it is possible to place multiple cameras in different directions and thereby monitor the surrounding situation in greater detail.

The following is an example of the positions of cameras mounted on the vehicle.

Cameras to detect peripheral vehicles when a lane change is made are placed at the positions of side mirrors. Cameras to detect peripheral vehicles when the car is parked or a lane change is made are attached to the rear part of the roof of the vehicle. Or cameras to detect peripheral vehicles at an intersection (blind monitoring: detecting the situation in the sideward directions which are invisible to the driver) are installed in the side directions of the vehicle roof or cameras to detect interrupting vehicles are placed on the front of the vehicle. In addition, cameras can also be installed inside the vehicle room to detect the driver's looking aside. Objects to be recognized can be not only vehicles but also peripheral objects.

Embodiment 5

Figure 15:
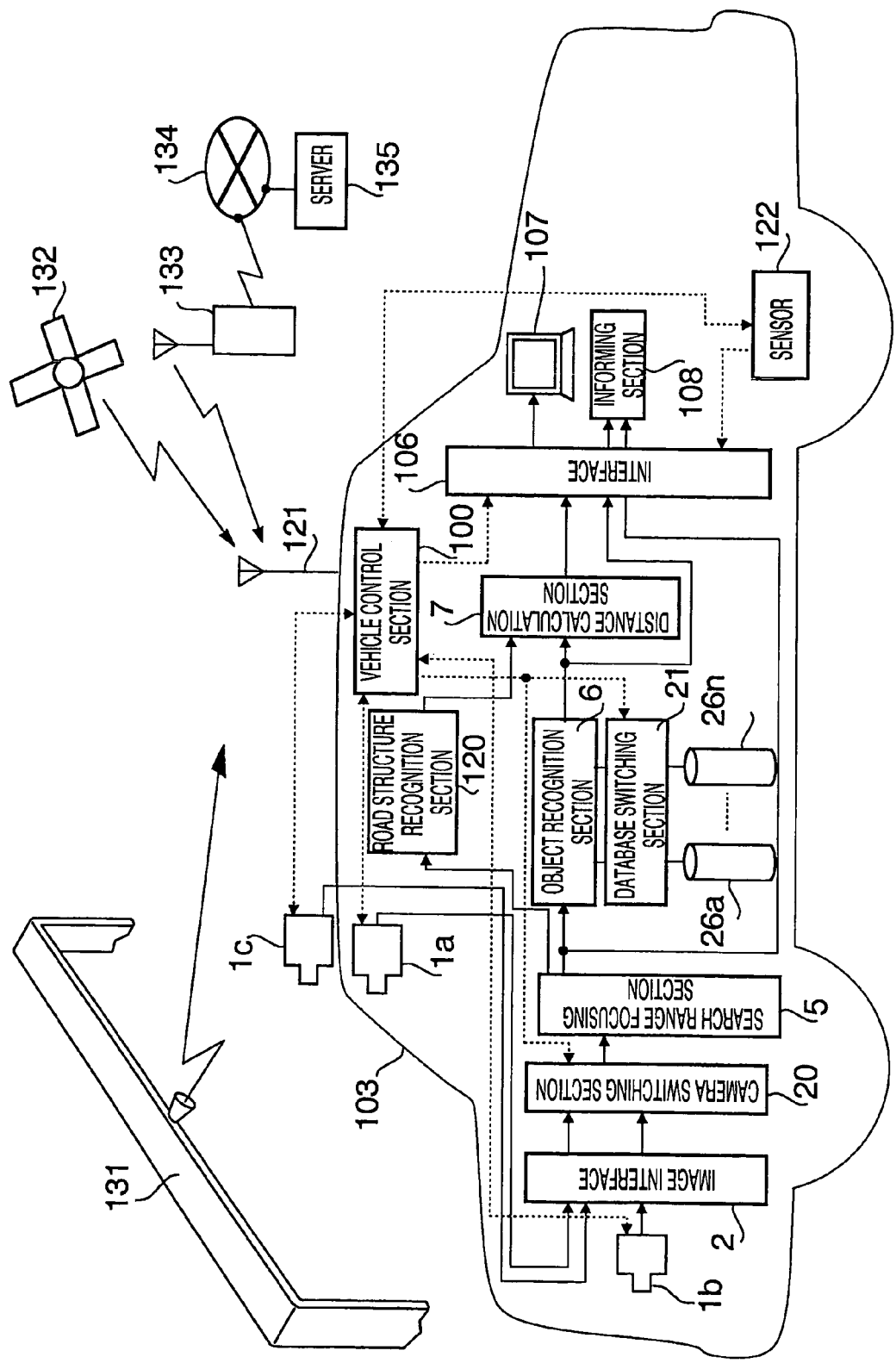
FIG. 15 is a block diagram showing an example of the object recognition apparatus (including the distance calculation section) of the present invention installed in a vehicle.

FIG. 15 is a block diagram showing a configuration of the image processing apparatus of the present invention (including the object recognition section and the distance measuring section by road structure recognition).

The basic configuration of the apparatus in FIG. 15 is almost the same as that in FIG. 12. However, the apparatus in FIG. 15 is different from the configuration in FIG. 12 in that the apparatus is provided with distance measuring section 7 that identifies the position of an object in a three-dimensional space using an object recognition result and accurately calculates the distance from a camera to the object in the three-dimensional space.

The functions and operations of the core sections of the image processing apparatus that carries out image processing of a traveling vehicle shown in FIG. 15 will be explained in a sequential order.

First, search range focusing section 5 will be explained.

Search range focusing section 5 in FIG. 15 focuses the search range looking for an area where a vehicle on the road is likely to be found based on the image data entered.

This search range focusing section 5 can make adjustments to suit the situation by widening the search range to prevent detection leakage or contrarily narrowing the search range to detect clear objects more efficiently, etc.

Figure 16:
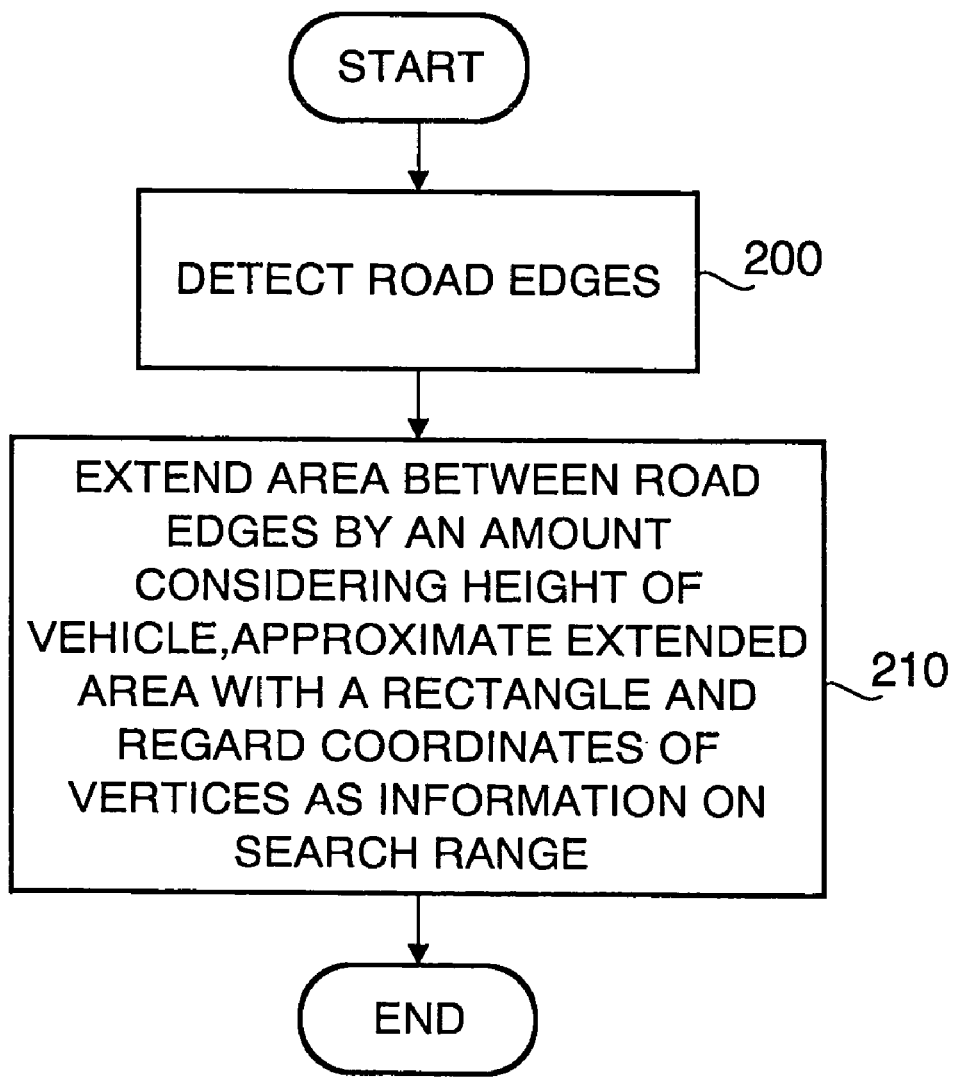
FIG. 16 is a flow chart to explain the operation of a search range focusing section.

Focusing of the search range is the processing to focus the overall image range on a range in which preceding vehicles (or can be vehicles that follow from behind) are estimated to be located with an extremely high probability for the purposes of attaining reduction of burden on the apparatus and speedy processing. A preferred example (procedure) of focusing the search range in this embodiment is shown in FIG. 16.

As illustrated, the road edges (white lines or shoulders on both sides of the road) are detected first (step 200).

Then, the area between the road edges is extended by an amount considering the height of the vehicle, the extended area is approximated with a rectangle and the coordinates of the vertices are regarded as the information on the search range (step 210).

This processing will be explained more specifically using FIGS. 17A, 17B and FIGS. 18A and 18B below.

Figure 17A:
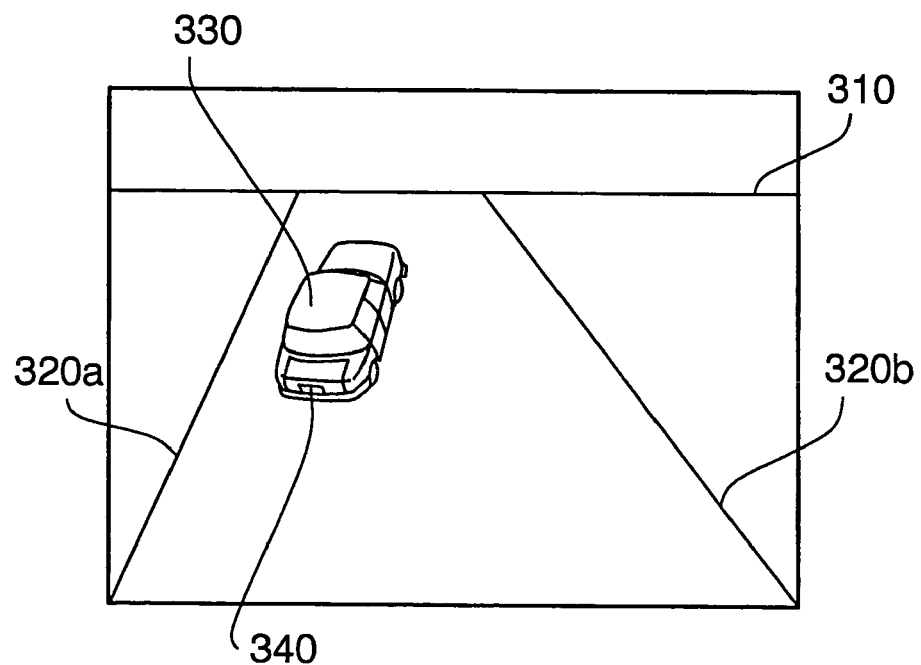
FIG. 17A illustrates an example of an image of a target object (vehicle) taken by one camera.
Figure 17B:
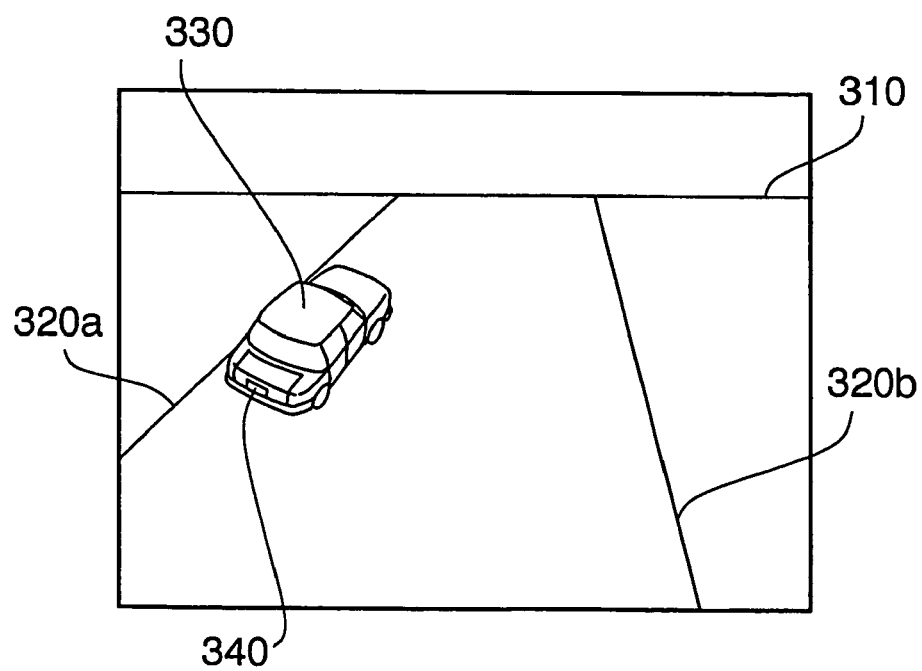
FIG. 17B illustrates an example of an image of a target object (vehicle) taken by another camera.

FIGS. 17A and 17B show examples of images taken by cameras 1a and 1c. That is, FIGS. 17A and 17B show images of a same vehicle taken by different cameras. That is, these are images of a (preceding) vehicle running ahead of the own vehicle taken by a plurality of cameras mounted on the own vehicle.

Based on this image data, search range focusing section 5 in FIG. 15 focuses the search range.

In FIGS. 17A and 17B, reference numeral 310 denotes the horizontal line and reference numerals 320a and 320b denote white lines indicating the edges of the road. Reference numeral 330 denotes the vehicle (preceding vehicle) to be detected and reference numeral 340 denotes a number plate.

First, the white lines on both ends of the road are detected from the image in FIG. 17A first (detection of the road edges, step 200 in FIG. 16).

Figure 18A:
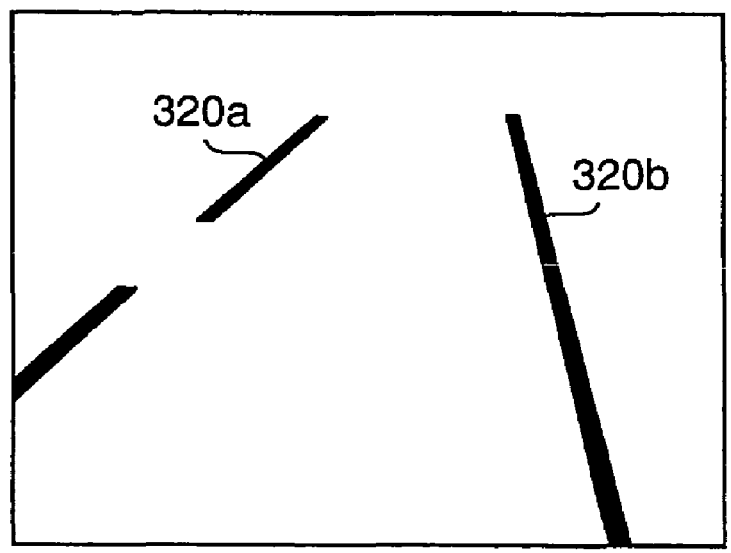
FIG. 18A illustrates path lines (white lines) extracted from an image taken by a camera.

FIG. 18A shows the state in which the white lines have been detected. At this time, in the case where some areas are not detected, these are complemented from the detected white lines using curve approximation or other methods.

Figure 18B:
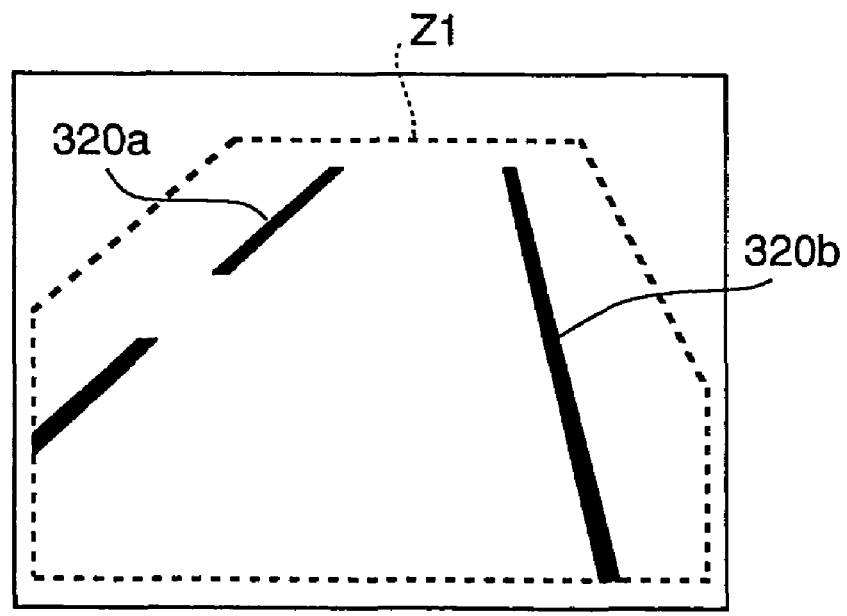
FIG. 18B illustrates a search range determined based on the extracted path lines (white lines)

Then, as shown in FIG. 18B, the area between the right and left white lines is extended by an amount considering the height of the vehicle and the extended area is approximated with a rectangle (step 210 in FIG. 16).

The area specified in this way is search range Z1 enclosed by dotted line in FIG. 18B. By the way, as described above, the size of the rectangular area is adjustable as appropriate.

Since the preceding vehicle must be running on the road, the vehicle must be located between white lines 320a and 320b at both ends. Furthermore, since the vehicle has a certain height, this should be taken into account and white lines 320a and 320b are parallel-translated upward and the height is regulated within the range that covers the entire preceding vehicle. Area Z1 is determined in this way. The information on the vertices of this area is sent to road structure recognition section 120 and object recognition section 6 in FIG. 15.

Compared to a case where the entire screen is searched, image data to be searched is reduced by the amount of focusing, thus alleviating the processing burden for detection of the position of the vehicle and calculation of the distance between vehicles.

Moreover, an adequate margin can also be secured in the aspect of processing time. Additionally, the method of focusing the search range in consideration of the road edges and height of the vehicle is simple and provides a high probability of detecting vehicle reliably.

However, this embodiment is not limited to this method, but can also use other focusing methods.

For example, the method using optical flows is also available. As shown above, an example of detection of vehicle areas using an optical flow method is disclosed in the document "Rear Side Monitoring by Moving Image Processing" (by Miyaoka et al., collected papers of lectures of the 4th symposium on Sensing via Image Information, pp. 351–354).

That is, two consecutive photographed images are prepared. It is examined where in the second image a specific area in the first image is located. Then, a vector connecting the specific area in the first image and the specific area in the second image is regarded as an optical flow. Then, based on the position of the optical flow in the coordinate system, the position of the vehicle is determined.

That is, suppose a case where both the own vehicle and preceding vehicle are moving. Both the preceding vehicle and road are seen moving from the viewpoint of the own vehicle. However, since the road and preceding vehicle are different in how they move and how fast they move, it is possible to focus on the difference in movements and focus the area in which the vehicle is possibly traveling. In this case, the accuracy of focusing is increased.

The area detected in this way is represented by a rectangle and the coordinates of the vertices are regarded as the area information.

It is further possible to focus the search range using stereo images. An example of detection of vehicle areas using stereo images is disclosed in the document "Development of Object Detection Technology Using Stereo Images" (by Kigasawa et al., collected papers of lectures of the 2nd symposium on Sensing via Image Information, pp. 259–264). Since focusing is carried out by recognizing a three-dimensional shape, exact focusing is possible.

The area detected in this way is expressed with a rectangle and the coordinates of the vertices are regarded as the area information. By the way, the height of detected three-dimensional objects, etc. can be adjusted as appropriate.

Moreover, the optical flow can also be used in combination with stereo images. That is, a sum of sets or a product of sets of an area detected using the optical flow and another area detected using stereo images is calculated to determine the area where image processing is performed.

This allows the area of a stationary vehicle, which cannot be detected only using the optical flow to be detected.

This also eliminates structures on the road, which are unnecessarily detected when only stereo images are used.

Then, the operation of detecting the position of a vehicle and the operation of calculating the distance to the vehicle will be explained.

Figure 19:
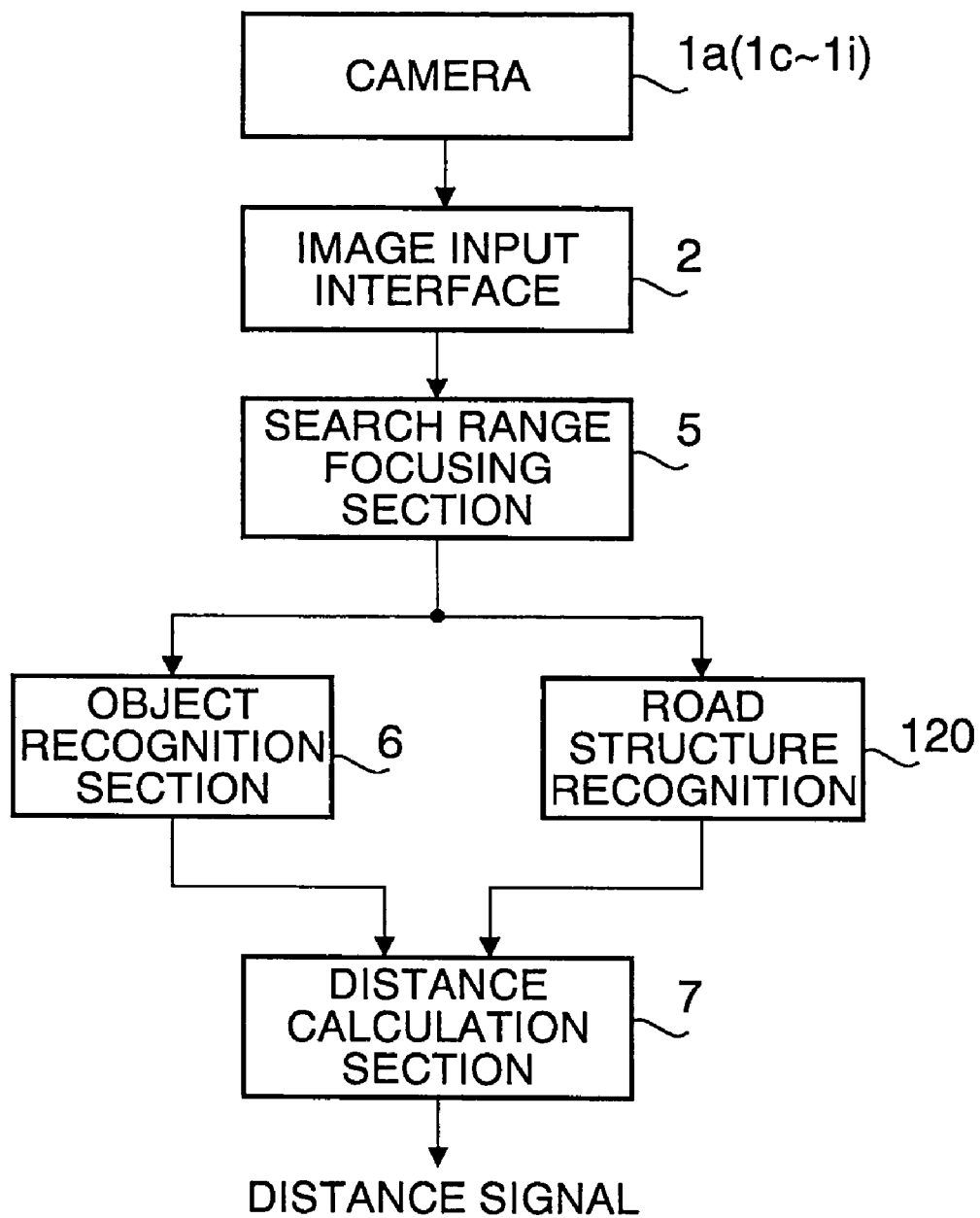
FIG. 19 is a block diagram showing a configuration example to measure the distance to an object.
Figure 20:
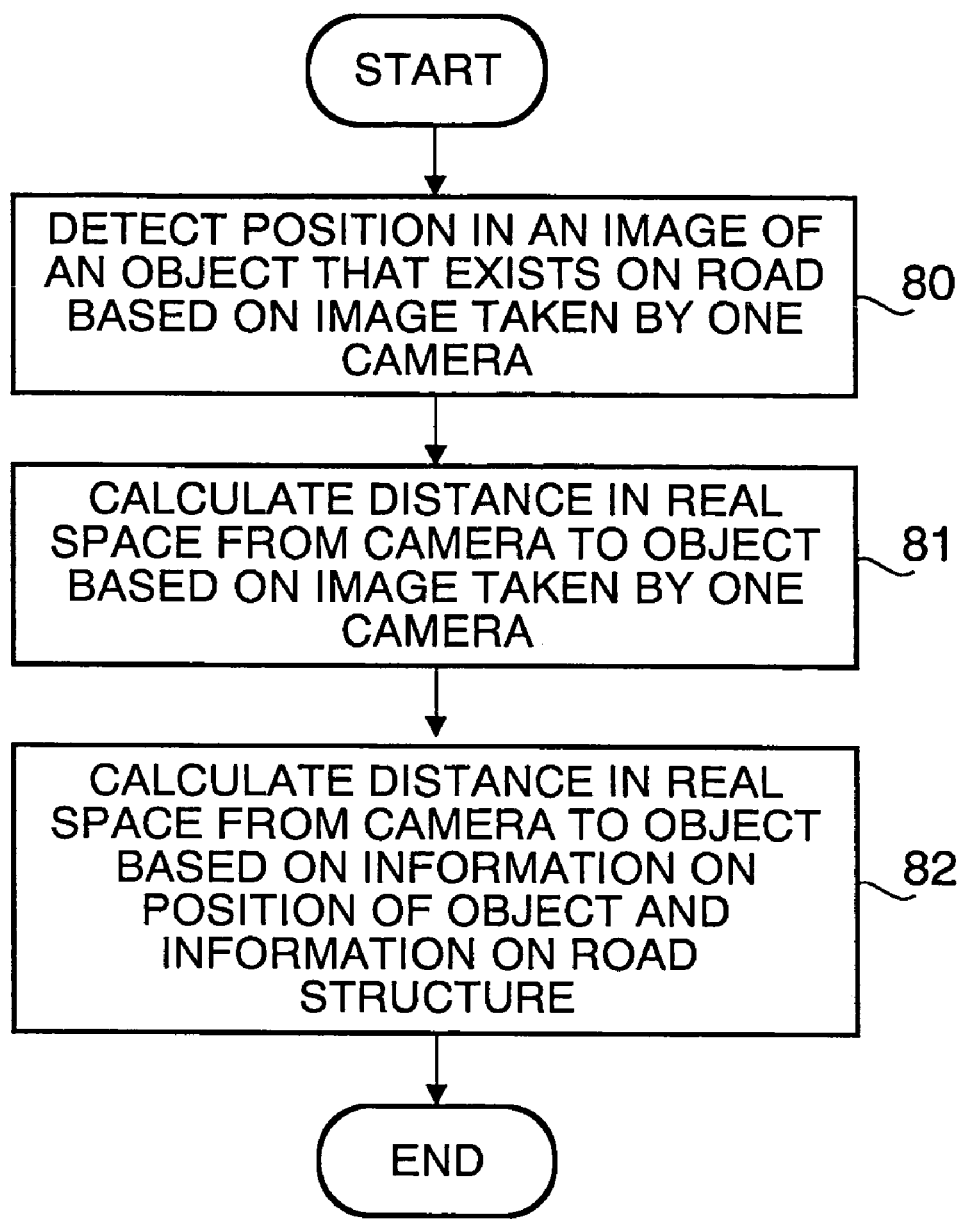
FIG. 20 is a flow chart showing a procedure for calculating an exact distance to an object.

FIG. 19 shows the parts related to the operation of detecting the position of a vehicle and the operation of calculating the distance to the vehicle extracted from the configuration in FIG. 15. Object recognition section 6, road structure recognition section 120 and distance calculation section 7 each calculate the distance to the vehicle using a procedure as shown in FIG. 20.

That is, object recognition section 6 detects the position in an image of an object on the road based on an image taken by one camera (step 80).

Then, road structure recognition section 120 recognizes a three-dimensional structure based on the images taken by the cameras (step 81).

Then, distance calculation section 7 calculates the distance from the camera to the object in a real space based on the information on the position of the object and information on the road structure (step 82).

Figure 21:
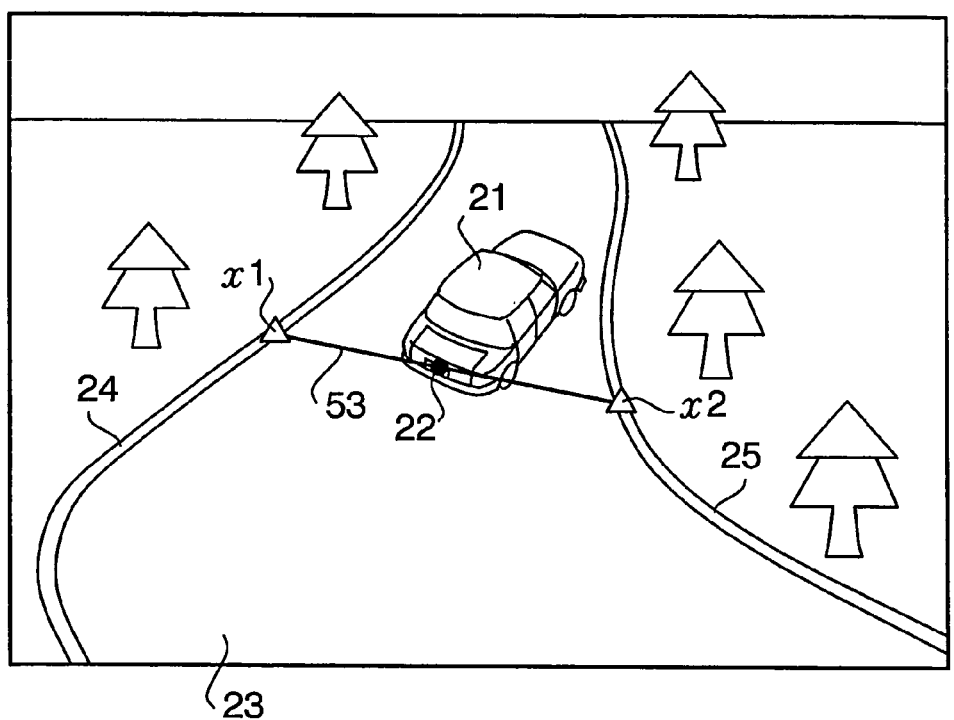
FIG. 21 illustrates an example of an image of a preceding vehicle taken by a camera mounted on the own vehicle.

FIG. 21 shows an image example taken by one camera.

As illustrated, vehicle 21, a detection target, is located on road 23. White lines 24 and 25 are drawn on the right and left of road 23.

Figure 22:
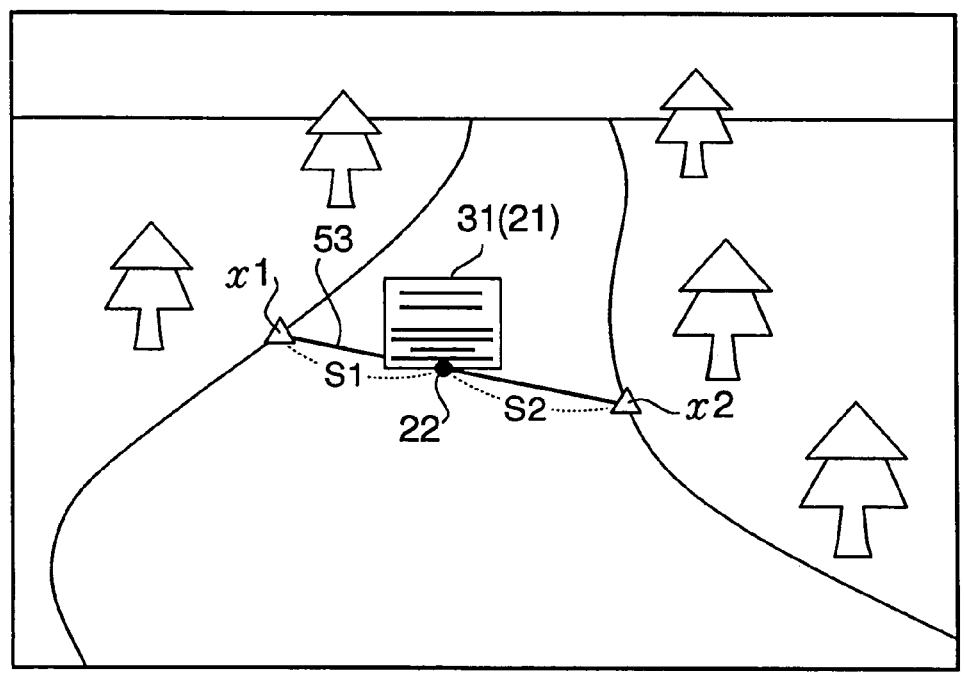
FIG. 22 illustrates an example of an image obtained by extracting horizontal edges.

For example, secondary differential processing and binary processing are applied to an input image of the rear face of the vehicle ahead. This gives a differential binary image as shown in FIG. 22. Then, horizontal edge components are extracted from the image obtained. Rectangular box 31 shown in the center of FIG. 22 represents the model of the car ahead to be detected.

Then, the pattern matching processing explained in the aforementioned embodiment (comparison with the learning model registered in the database) is applied and the position and type, etc. of the vehicle in the image are detected.

Furthermore, the positions of the road edges can be easily identified by recognizing the positions of the right and left white lines as the edges of the road, for example. Even if the white lines are interrupted, it is possible to determine the road edges by complementing the white lines through curve complementing or linear complementing.

The position of the detected vehicle in the image can be expressed in coordinates of the points representing the vehicle. For example, suppose the midpoint of the lower side of the rectangular box in FIG. 22 (reference numeral 22) is the position of the vehicle ahead.

Furthermore, the position of the vehicle can be determined in association with the road edges as shown in FIG. 21 and FIG. 22.

That is, from among an infinite number of line segments connecting the right and left edges of the road and passing coordinate point 22 of the vehicle, the shortest line segment (reference numeral 53 in FIG. 21 and FIG. 22) is selected.

The two points at which the selected line segment 53 intersects with the road edges are assumed to be x1 and x2. As shown in FIG. 20, when distances S1 and S2 from points x1 and x2 to coordinate point 22 of the vehicle are obtained, the relative positional relation between the road and vehicle is uniquely determined.

Detection of an object (vehicle) and detection of the position thereof have been explained above.

Next, detection of the three-dimensional road structure will be explained below.

Road structure recognition section 120 recognizes the structure in the real space of road 23 based on the image data (image information taken by one camera) input.

An example of a system of recognizing the structure of the road plane in the real space from an image without depth information (image taken by one camera) is disclosed in the document "Reconstruction of Road Shape by Local Plane Approximation" (Watanabe et al., Technical Report of IPSJ CV62-3).

This system focuses on points corresponding to the right and left road edges in an image and determines a three-dimensional road structure based on knowledge on the road shape called a "road model".

This method of reconstructing the road structure will be briefly explained below with reference to FIG. 23A to FIG. 23C.

Figure 23A:
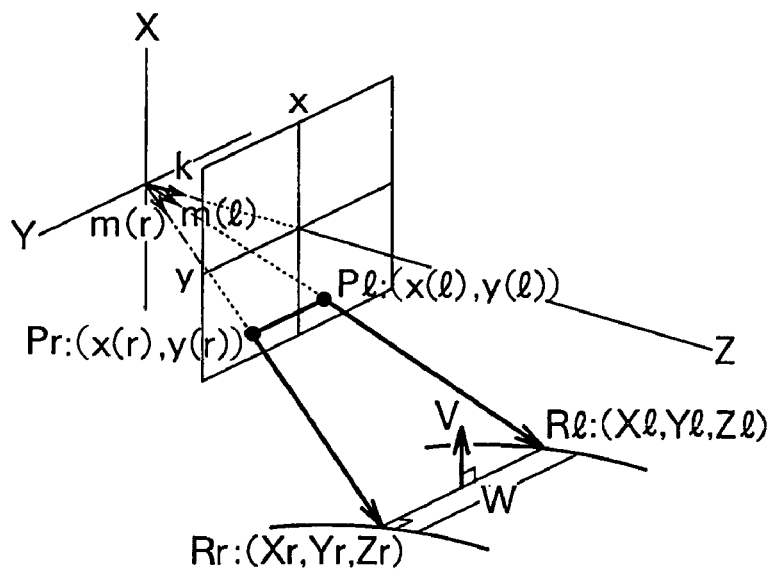
FIG. 23A is a drawing to explain the processing for reconstructing a three-dimensional road structure from an image taken by one camera.

In FIG. 23A, the origin of coordinates "O" denotes the position of a camera. m(l) is a vector defined based on the left edge point of the road. m(r) is a vector defined based on the right edge point of the road.

Coordinate points Pl and Pr denote the left end point and right end point, respectively on a same line of the road in the image taken by one camera. Coordinate points Rl and Rr denote the left end point and right end point of the road, respectively on the road in the real space.

By multiplying the left end point and right end point (Pl, Pr) of the road in the image by a predetermined vector arithmetic coefficient, it is possible to determine the corresponding coordinate points (Rl, Rr) on the road in the real space. The loci of the determined coordinate points Rl and Rr form the shapes of the edges of the road.

That is, the three-dimensional shapes of the road edges are assumed to be the loci drawn by both end points of a virtual line segment connecting the left end point and right end point of the road when the line segment moves on a smooth curve.

Figure 23B:
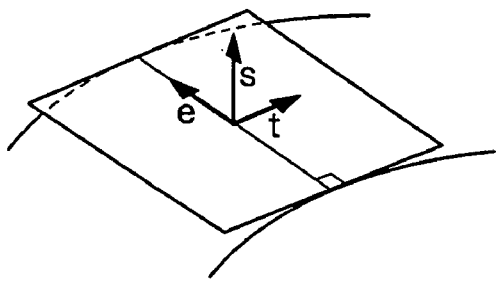
FIG. 23B is a drawing to explain the processing for reconstructing a three-dimensional road structure from an image taken by one camera.

Though the actual road has a certain gradient, from a local point of view as shown in FIG. 23B, the tangent (t) on the road plane and the virtual line segment (e) can be considered to be included in a same plane (local plane approximation).

Figure 23C:
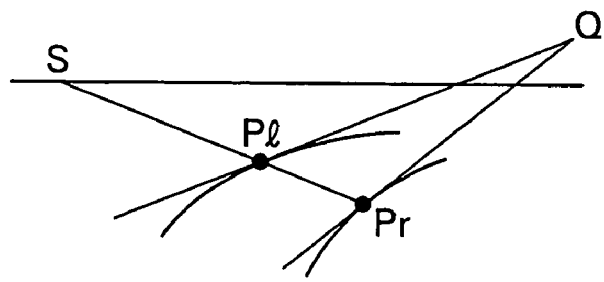
FIG. 23C is a drawing to explain the processing for reconstructing a three-dimensional road structure from an image taken by one camera.

Moreover, as shown in FIG. 23C, when a condition that the point at infinity (Q) in the tangential direction of the road is on the horizontal line and the line segment (Pl-Pr) crosses the edge of the road at right angles is applied, the two corresponding points on the two-dimensional road can be calculated through vector operations.

The shape of the road is reconstructed by applying a road model so that a three-dimensional variation of the positions of the calculated right and left edges of the road becomes a smooth curve.

The road model is constructed under conditions that the distance between the right and left edges of the road is constant and any line segment connecting these edges is always horizontal.

This is an outline of the method of reconstructing the shape of the road disclosed in "Reconstruction of Road Shape by Local Plane Approximation".

Then, the processing of detecting the distance from the own vehicle to the vehicle ahead by distance calculation section 7 will be explained.

Figure 24:
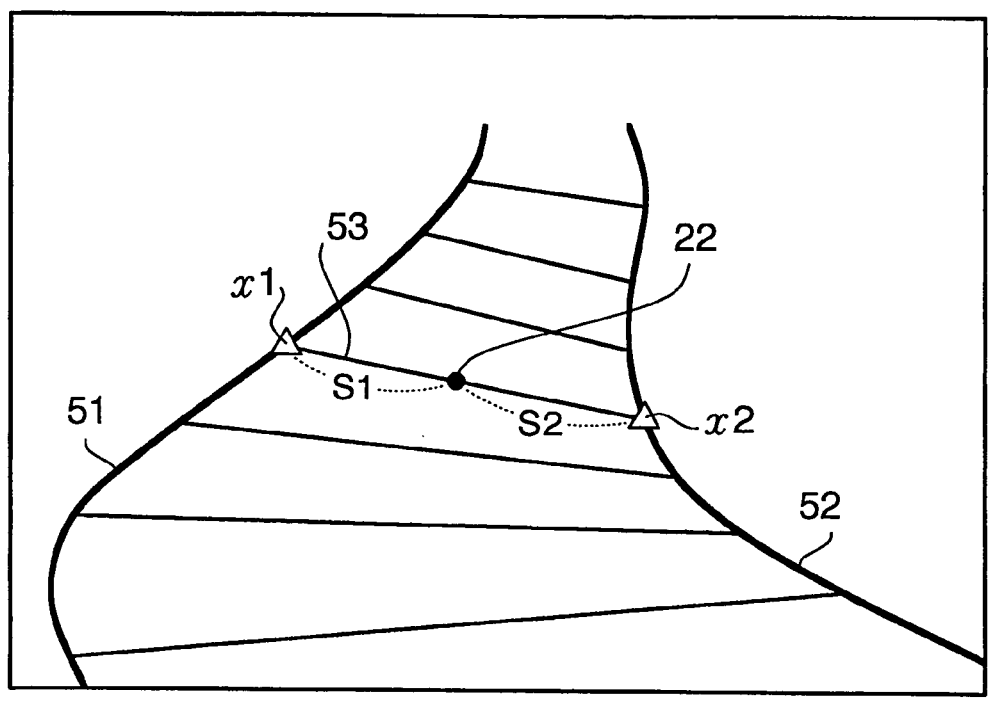
FIG. 24 is a drawing to explain a method of identifying a positional relationship between the road and vehicle.

FIG. 24 illustrates a relative positional relation between a vehicle ahead (detection target) in an image taken by one camera and the edges of the road.

As explained above using FIG. 19 and FIG. 20, the position of the vehicle and the positions of the right and left edges of the road corresponding to the vehicle are already identified.

That is, as shown in FIG. 24, coordinate point 22 located almost at the center of the road indicates the position of the vehicle ahead.

The shortest line segment passing coordinate point 22 is line segment 53. Here, it is also possible to determine line segment 53 in such a way as to have a predetermined length.

The points at which line segment 53 crosses edges 51 and 52 of the road are x1 and x2 (edge points).

Thus, in one image taken by one camera, the position of the vehicle and the relative positional relation between the vehicle and the edges of the road are identified.

Then, the three-dimensional road structure is reconstructed using the method shown in FIG. 23A to FIG. 23C. The reconstructed road structure is shown in FIG. 25.

Once the position of the vehicle ahead on the reconstructed three-dimensional road structure is known, the distance from the camera to the vehicle in the real space can be calculated through simple arithmetic operations (geometric operations).

Figure 25:
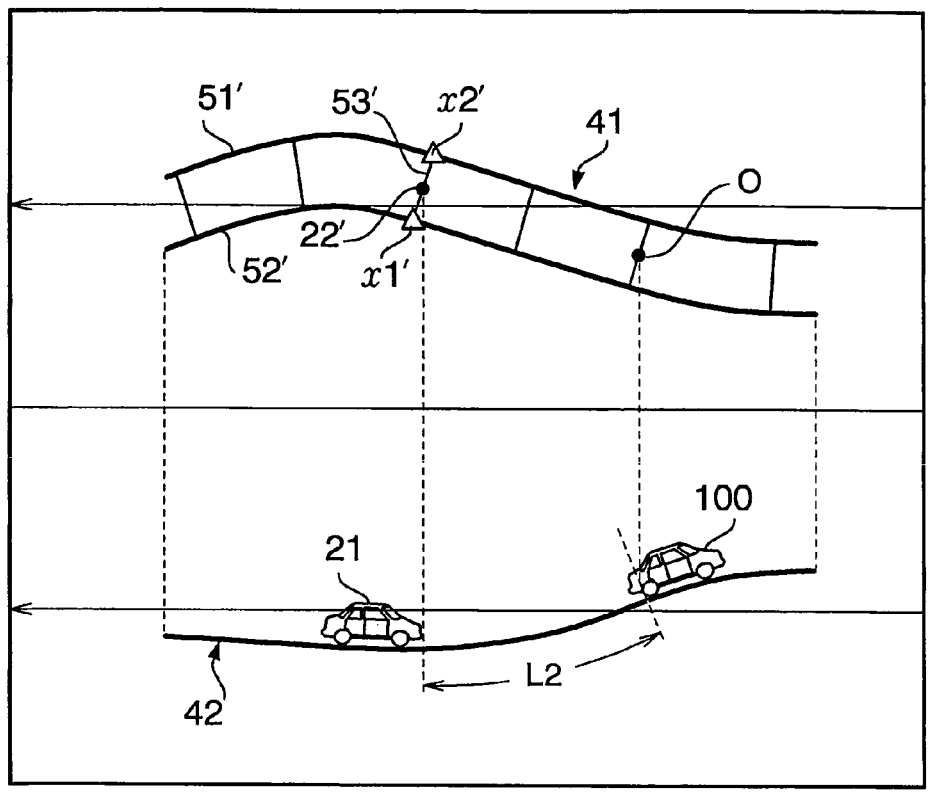
FIG. 25 is a drawing to explain a method of reconstructing a three-dimensional road structure from an image taken by one camera and identifying the position of the vehicle on the three-dimensional road.

Reference numeral 41 in FIG. 25 denotes a top view of the shape of the road. On the other hand, reference numeral 42 denotes a side view of the shape of the road plane.

As shown in FIG. 21 and FIG. 24, the right and left edges of the road in one image have a one-to-one correspondence with the right and left edges of the road on the three-dimensional road structure.

That is, it is possible to determine the points on the reconstructed road structure shown in FIG. 25 that correspond to the right and left edges of road edge points x1 and x2 in the image of FIG. 21 and FIG. 24.

In FIG. 25, point x1' corresponds to point x1 in FIG. 21 and FIG. 24. Likewise, point x2' corresponds to point x2 in FIG. 21 and FIG. 24. Thus, once the end points of the road (x1', x2') in the real space are determined, line segment 53' connecting these end points is determined.

The vehicle ahead is located on line segment 53' in the real space. As shown in FIG. 22 and FIG. 24, the vehicle in the image is located at distance S1 from point x1 and at distance S2 from point x2.

Position 22' of the vehicle on line segment 53' in FIG. 25 is determined from such a relative positional relation between the vehicle and road.

Once position 22' of the vehicle in the three-dimensional space is detected, it is possible to determine the distance from the coordinates (origin O) of the camera mounted on the own vehicle to the vehicle ahead through simple arithmetic operations.

In this way, it is possible to determine the three-dimensional shape of the road as shown in FIG. 25 and the three-dimensional position of the vehicle on the road from the image as shown in FIG. 21.

The processing of detection of the position of the vehicle, detection of a relative relationship between the vehicle and road and calculation of the distance to the vehicle ahead according to the present invention have been explained.

The processing of distance detection in the present invention is summarized as shown in FIG. 20.

That is, the position in an image of an object that exists on the road is detected based on the image taken by one camera first (step 80). Then, the road structure is recognized based on the image taken by the camera (step 81). Then, the distance in the real space from the camera to the object is calculated based on the information of the position of the object and the information of the road structure (step 82).

As explained above, by preparing the database storing the model shown in FIG. 7, it is possible to estimate the distance to an object to a certain degree through object recognition processing alone, but the accuracy has a certain limit. By including a distance measuring section as shown in this embodiment, it is possible to measure an exact distance to the object in the real space from images taken by one camera.

The function and operation of the configuration shown in FIG. 15 (configuration measuring the distance to another vehicle in the three-dimensional space through image processing including object recognition) have been explained so far.

The present invention has been explained so far with reference to the embodiments thereof. The present invention is however not limited to these embodiments. The embodiments describe the case where the distance to an object in the real space is measured by applying image processing to images taken by one camera, but the present invention is not necessarily limited to these embodiments.

For example, in the case where the amount of image processing or the space allotted to the cameras installed is allowed to increase, it is not impossible to acquire images through stereo picture taking using two cameras 60*a* and 60*b* (70*a* and 70*b*) as shown in FIG. 26 and measure the distance to the object in the three-dimensional space using stereo image processing apparatus 61 (71). Object recognition using pattern matching of the present invention, however, is still applicable to this case.

As shown above, the present invention adopts a configuration providing one image processing apparatus for a plurality of cameras and thereby reduces the volume of hardware. That is, the image information acquired through picture taking by a plurality of cameras is input to a common image processing apparatus.

Then, the image processing apparatus compares the image data entered and the data about models registered in the database (pattern matching), decides the similarity and thereby detects the position of the object, type of the object and a rough distance to the object at an extremely high speed.

The database registers data about various models. To improve the efficiency of pattern matching at this time, a plurality of databases is provided and a database to be used is selected appropriately according to the use.

Establishing the correspondence between databases and cameras and switching between databases according to the camera used eliminates the need for unnecessary searches of databases and speeds up processing. Furthermore, focusing the databases to be searched means that the probability of erroneous decisions reduces that much and contributes to improvement of the accuracy of pattern matching.

In addition to the example of providing a database for every camera, there can also be an example of providing a plurality of databases only based on conditions such as weather and time zone. More specifically, a database to be used is selected according to the camera used or a database to be used is selected according to the picture taking conditions and driving situation of the own vehicle.

As a fast pattern matching method, there is a technique of multiplying input image data by a feature extraction vector which has been acquired beforehand, obtaining a feature vector with features about predetermined models enhanced and comparing this with the feature vector of the model registered in the database.

Furthermore it is desirable that the image processing apparatus apply processing of focusing the search range of an object to some areas of the image entered to reduce the amount of data subject to image processing. This makes it possible not only to reduce burden on hardware but also to attain high-speed processing.

When the distance from the position of a camera to a recognized object is measured, pattern matching is performed with a model stored in the database, which includes information on the distance to the object as a parameter.

To carry out more accurate distance measurement, image processing is carried out based on the image information from one camera that has taken pictures of the object and the distance to the object in the three-dimensional space is specified. This allows one camera to measure the distance to the object in the three-dimensional space without the need to carry out stereo picture taking.

Furthermore, providing the user (e.g., driver of a vehicle) with information on images taken by a plurality of cameras, information on the type of the object recognized by pattern matching (e.g., type of the vehicle), information on the distance to the object in real time can reduce burden on the user and prevent danger.

The present invention allows the image processing apparatus that processes images entered from a plurality of cameras to be used commonly and thereby reduces the number of image processing sections handled and alleviates the processing burden on the apparatus.

Furthermore, the present invention can reduce the amount of information to be processed itself, improve the efficiency and recognize (estimate) objects more accurately by detecting positions using pattern recognition, etc.

Therefore, the present invention can also calculate the distance to the object accurately by these synergetic effects and provide a practical object recognition method and object recognition apparatus satisfying both real time characteristic and reliability.

As described above, the present invention can make the efficiency of image processing (processing speed) compatible with the accuracy of object recognition and the accuracy of measurement of the distance to the object. This allows high-speed and highly reliable distance measurement. The present invention can also offer the user real time and useful information. The present invention provides an extremely important element technology in putting the ITS system to practical use.

The present invention is not limited to the above described embodiments, and various variations and modifications may be possible without departing from the scope of the present invention.

This application is based on the Japanese Patent Application No. 2000-194199 filed on Jun. 28, 2000 and No. 2001-139052 filed on May 9, 2001, entire content of which is expressly incorporated by reference herein.

What is claimed is:

1. An object recognition apparatus, comprising:
   a plurality of cameras that each take an image of an object and obtain image data of said object;
   a plurality of databases that each have registered therein a plurality of model data concerning object models, each of the plurality of databases being associated with one of the plurality of cameras and one of a condition of an environment and a combination of conditions of the environment;
   a search range focusing section that narrows down an area in each image data where a corresponding object is likely to exist and makes said area a search range; and an object recognition section that selects one of the plurality of databases based on a camera corresponding to the image data and one of a detected condition of the environment and a combination of detected conditions of the environment, compares the image data in the search range in each image data with the plurality of model data in the selected database, detects model data presenting a highest similarity to the image data, and detects the object in the image data using said model data, wherein the object recognition section is provided for common use by the plurality of cameras.

2. The object recognition apparatus of claim 1, wherein the plurality of databases each have registered therein a plurality of feature vectors obtained by multiplying the image data from the corresponding camera by a feature extraction matrix provided for extracting features of a predetermined object, and the object recognition section compares a plurality of feature vectors obtained by multiplying the image data in the search range in each image data with the plurality of feature vectors in the corresponding database and detects a feature vector in the database presenting a highest similarity with the object said feature vector represents.

3. The object recognition apparatus of claim 1, wherein the conditions comprise at least one of a distance between each camera and object, a direction of the object with respect to the camera, weather, and time of day.

4. An object recognition apparatus, comprising:
a plurality of cameras that each generate image data;
a plurality of databases that store model object data, each of the plurality of databases being associated with one of the plurality of cameras and one of a condition of an environment and a combination of conditions of the environment;
a search range focusing section that selects a reduced portion of the image data; and
an object recognition section that selects one of the plurality of databases based on a camera corresponding to the image data and one of a detected condition of the environment and a combination of detected conditions of the environment, compares the selected portion of the image data to the stored model object data, selects stored model object data that has a highest similarity to the selected reduced portion of the image data, and detects an object from the image data using the selected model object data.

5. The object recognition apparatus of claim 4, wherein each of the plurality of databases stores a plurality of model feature vectors obtained by multiplying model image data by a feature extraction matrix configured to extract features of a predetermined object, and the object recognition section generates an integrated vector based on the selected reduced portion of the image data, multiplies the integrated vector by the feature extraction matrix to generate an object feature vector, and selects a model feature vector having a highest similarity to the object feature vector.

6. The object recognition apparatus of claim 4, wherein the conditions comprise at least one of a distance between a camera and an object, a direction of an object with respect to a camera, weather, and time of day.

7. A method for recognizing an object, comprising:
generating image data with one of a plurality of cameras;
selecting a reduced portion of the image data;
selecting a database from a plurality of databases based on a camera that generated the image data and one of a detected condition of an environment and a combination of detected conditions of the environment, each of the plurality of databases being associated with one of the plurality of cameras and one of a condition of the environment and a combination of conditions of the environment;
comparing the selected portion of the image data to model object data stored in the selected database;
selecting the stored model object data that has a highest similarity to the selected portion of the image data; and
detecting an object from the image data using the selected stored model object data.

8. The method of claim 7, further comprising:
obtaining a plurality of model feature vectors by multiplying model image data by a feature extraction matrix configured to extract features of a predetermined object;
storing a plurality of model feature vectors in each of the plurality of databases;
generating an integrated vector based on the selected portion of the image data;
multiplying the integrated vector by the feature extraction matrix to generate an object feature vector; and
selecting a model feature vector having a highest similarity to the object feature vector.

9. The method of claim 7, wherein the condition comprises at least one of a distance between a camera and an object, a direction of an object with respect to a camera, weather, and time of day.

* * * * *